US012641581B2

(12) United States Patent
Huang et al.

(10) Patent No.: US 12,641,581 B2
(45) Date of Patent: May 26, 2026

(54) PERFORMING CARRIER SWITCHING WITH FALLBACK CONTROL INFORMATION

(71) Applicant: QUALCOMM Incorporated, San Diego, CA (US)

(72) Inventors: Yi Huang, San Diego, CA (US); Yan Zhou, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 17/855,864

(22) Filed: Jul. 1, 2022

(65) Prior Publication Data

US 2023/0107842 A1 Apr. 6, 2023

Related U.S. Application Data

(60) Provisional application No. 63/250,852, filed on Sep. 30, 2021.

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0053* (2013.01); *H04W 48/20* (2013.01); *H04W 72/02* (2013.01)

(58) Field of Classification Search
CPC . H04W 72/0453; H04W 48/20; H04W 72/02; H04W 72/21; H04L 5/0053; H04L 5/0098; H04L 1/1812; H04L 5/0055
See application file for complete search history.

(56) References Cited

U.S. PATENT DOCUMENTS

| 2011/0044261 A1* | 2/2011 | Cai | ....................... | H04L 5/0091 |
| | | | | 370/329 |
| 2018/0054824 A1* | 2/2018 | Xue | ...................... | H04L 5/0098 |

(Continued)

FOREIGN PATENT DOCUMENTS

| EP | 2996418 A1 | 3/2016 |
| EP | 3433968 A1 | 1/2019 |

OTHER PUBLICATIONS

International Search Report and Written Opinion—PCT/US2022/043679—ISA/EPO—Dec. 19, 2022.

*Primary Examiner* — Michael A Keller
*Assistant Examiner* — Thao D Duong
(74) *Attorney, Agent, or Firm* — Holland & Hart LLP

(57) ABSTRACT

Methods, systems, and devices for wireless communication at a user equipment (UE) are described. A UE may identify that carrier switching is enabled at the UE for a physical uplink control channel and may receive a control signal that lacks an indication for carrier switching. The UE may monitor for a downlink transmission on a primary serving cell of a set of serving cells in a physical uplink control channel group. The UE may then select one of the set of serving cells to transmit feedback information for the downlink transmission, where the selecting is based on carrier switching being enabled at the UE while the control signal lacks the indication for carrier switching. The UE may transmit, to the network entity, the feedback information for the downlink transmission in accordance with the selecting.

30 Claims, 17 Drawing Sheets

(51) Int. Cl.
    *H04W 48/20*         (2009.01)
    *H04W 72/02*         (2009.01)

(56) References Cited

U.S. PATENT DOCUMENTS

| | | | |
|---|---|---|---|
| 2019/0044678 A1* | 2/2019 | Liu | H04L 27/261 |
| 2019/0254008 A1* | 8/2019 | Medles | H04W 72/23 |
| 2020/0280971 A1* | 9/2020 | Moon | H04L 5/0053 |
| 2022/0150036 A1* | 5/2022 | Ye | H04L 5/0098 |
| 2022/0240187 A1* | 7/2022 | Guo | H04W 76/30 |
| 2023/0328664 A1* | 10/2023 | Tang | H04W 56/0015 |
| | | | 370/318 |
| 2025/0008514 A1* | 1/2025 | Chien | H04W 72/231 |

* cited by examiner 110-a 220-a    210    205

Network
Entity 105-a 215    220-b 115-a

▨ Control Signaling

▓ Downlink Transmission

░ Feedback Information

200

The control signal lacks an indication for carrier switching

405

Radio resource control signal includes an indication of a carrier switching time pattern?

410

Yes

No

Select a secondary serving cell to transmit the feedback information

415

Select a primary serving cell to transmit the feedback information

420

400

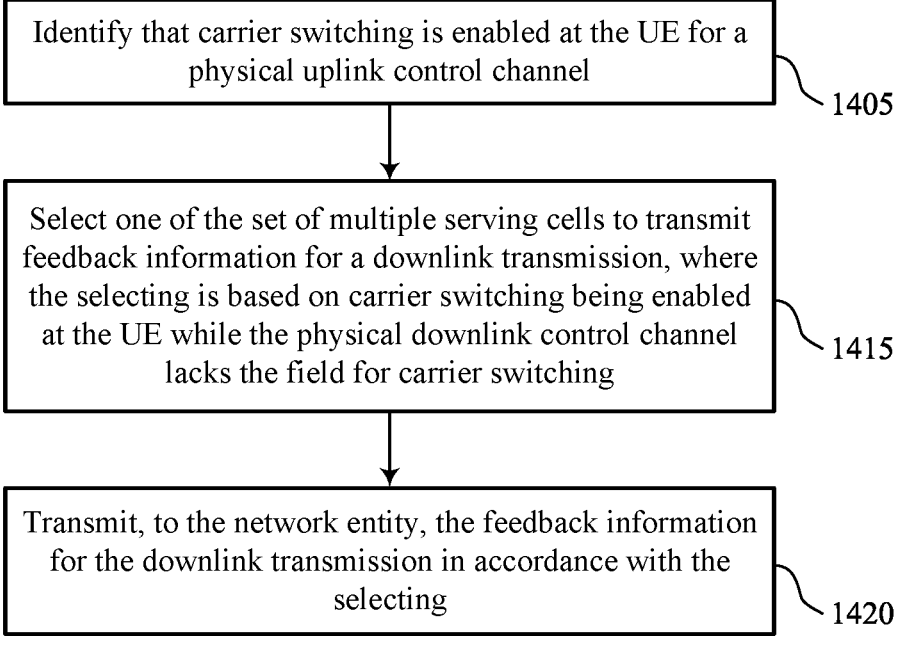

Identify that carrier switching is enabled at the UE for a physical uplink control channel

1405

Select one of the set of multiple serving cells to transmit feedback information for a downlink transmission, where the selecting is based on carrier switching being enabled at the UE while the physical downlink control channel lacks the field for carrier switching

1415

Transmit, to the network entity, the feedback information for the downlink transmission in accordance with the selecting

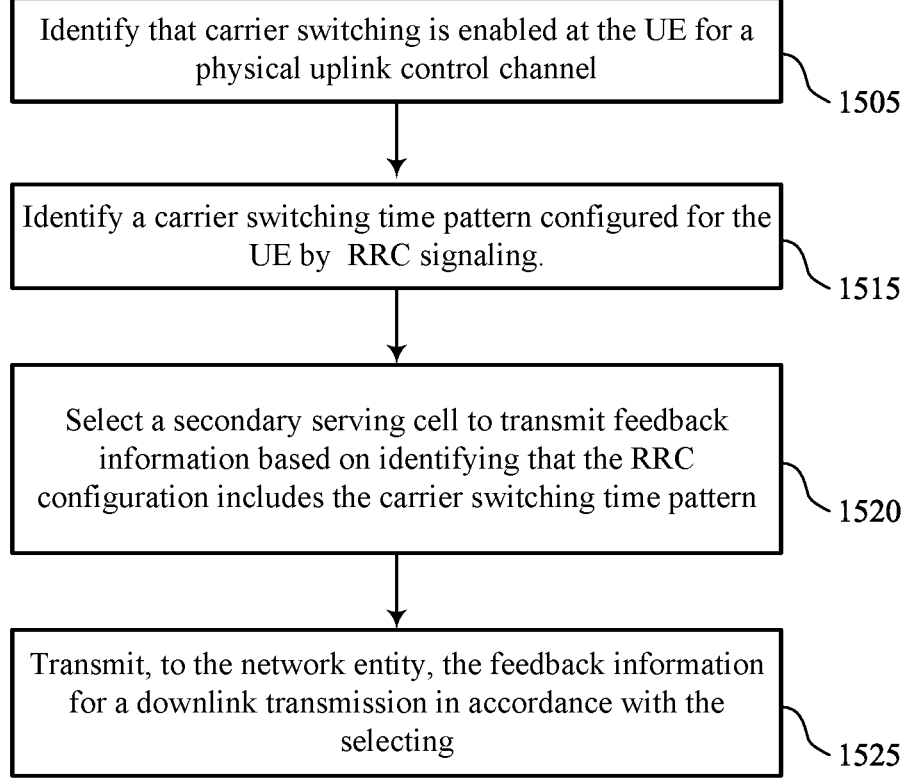

Identify that carrier switching is enabled at the UE for a physical uplink control channel

1505

Identify a carrier switching time pattern configured for the UE by RRC signaling.

1515

Select a secondary serving cell to transmit feedback information based on identifying that the RRC configuration includes the carrier switching time pattern

1520

Transmit, to the network entity, the feedback information for a downlink transmission in accordance with the selecting

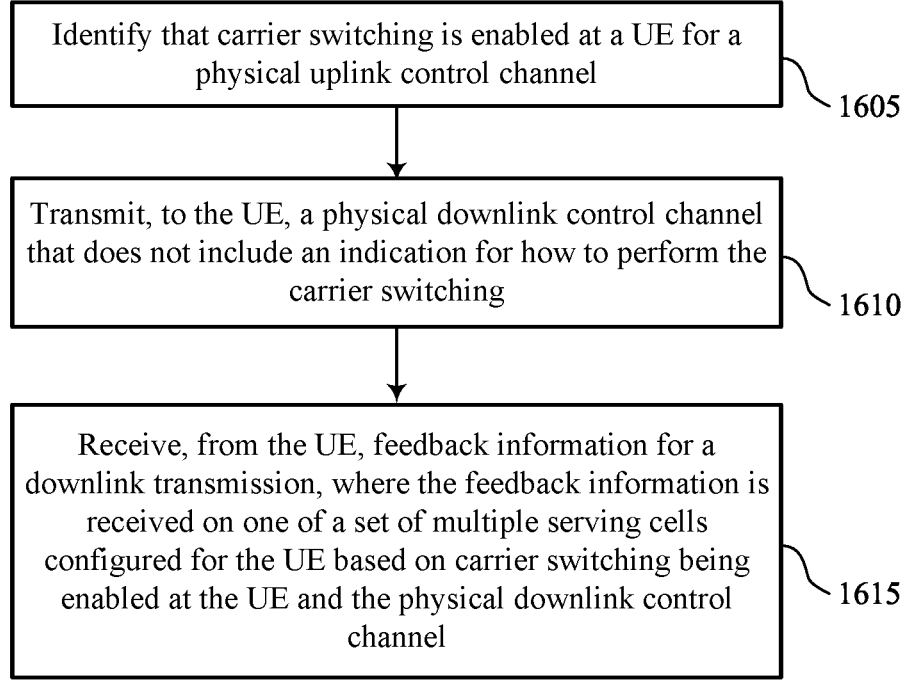

Identify that carrier switching is enabled at a UE for a physical uplink control channel

1605

Transmit, to the UE, a physical downlink control channel that does not include an indication for how to perform the carrier switching

1610

Receive, from the UE, feedback information for a downlink transmission, where the feedback information is received on one of a set of multiple serving cells configured for the UE based on carrier switching being enabled at the UE and the physical downlink control channel

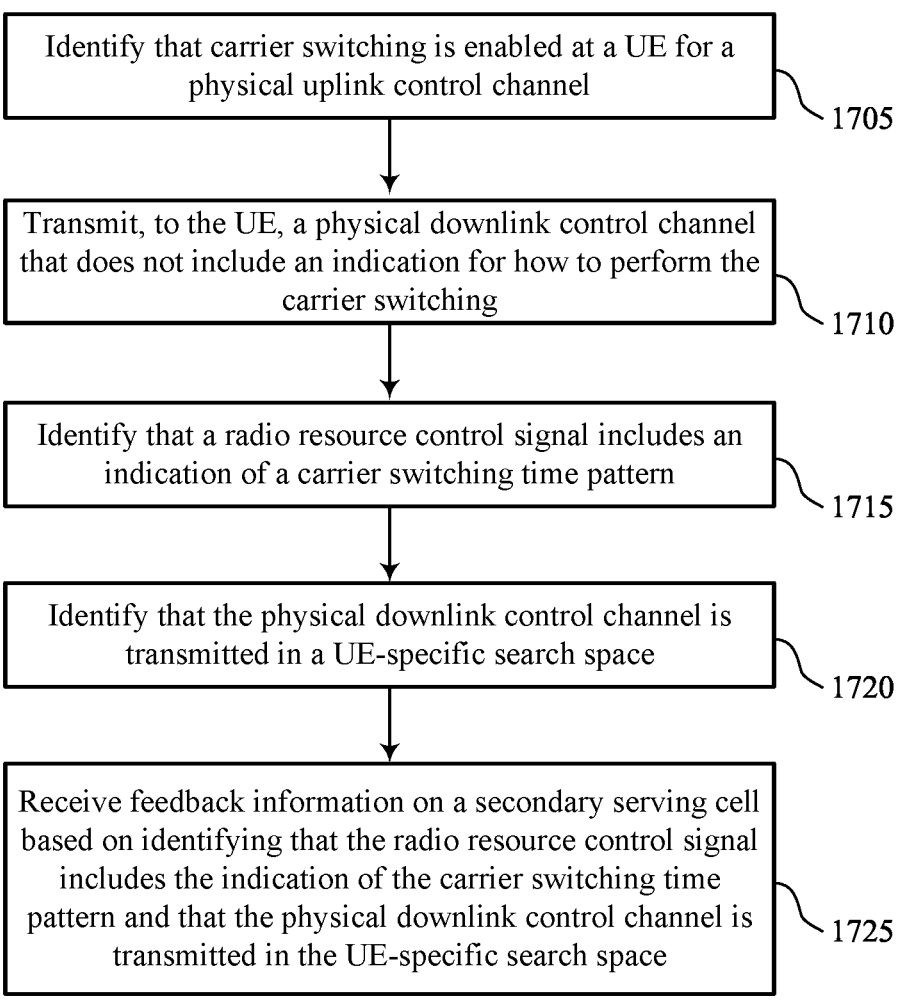

Identify that carrier switching is enabled at a UE for a physical uplink control channel

1705

Transmit, to the UE, a physical downlink control channel that does not include an indication for how to perform the carrier switching

1710

Identify that a radio resource control signal includes an indication of a carrier switching time pattern

1715

Identify that the physical downlink control channel is transmitted in a UE-specific search space

1720

Receive feedback information on a secondary serving cell based on identifying that the radio resource control signal includes the indication of the carrier switching time pattern and that the physical downlink control channel is transmitted in the UE-specific search space

PERFORMING CARRIER SWITCHING WITH FALLBACK CONTROL INFORMATION

CROSS REFERENCE

The present Application for Patent claims the benefit of U.S. Provisional Patent Application No. 63/250,852 by HUANG et al., entitled "PERFORMING CARRIER SWITCHING WITH FALLBACK CONTROL INFORMATION," filed Sep. 30, 2021, assigned to the assignee hereof, and expressly incorporated by reference herein.

FIELD OF TECHNOLOGY

The following relates to wireless communication at a user equipment (UE), including performing carrier switching with fallback control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities or one or more network access nodes, each simultaneously supporting communication for multiple communication devices, which may be otherwise known as user equipment (UE). In some wireless communications systems, a network entity may configure UEs for feedback transmission. For example, a network entity may configure a UE to transmit feedback to the network entity during a first time duration. In some cases, however, there may be insufficient available resources for transmission of the feedback. As such, in some examples, feedback transmission techniques may be deficient.

SUMMARY

The described techniques relate to improved methods, systems, devices, and apparatuses that support performing carrier switching with fallback control information. Generally, the described techniques provide for a user equipment (UE) implementing physical uplink control channel carrier switching and feedback deferral in the absence of a carrier switch indication in a control signal (e.g., a field in the control signal). Techniques depicted herein provide for transmission of feedback information for a downlink transmission. The UE may receive a control signal that lacks an indication for carrier switching. In some examples, a UE may monitor a first slot for a downlink transmission on a primary serving cell (e.g., component carrier) of multiple serving cells in a physical uplink control channel group. The UE may be configured to transmit feedback information for the downlink transmission in one serving cell of a set of serving cells. The UE may select either primary component carrier or a secondary component carrier for transmission of the feedback information based on identifying that carrier switching is enabled at the UE and receiving a control signal that lacks an indication for carrier switching.

A method for wireless communication at a user equipment (UE) is described. The method may include identifying that carrier switching is enabled at the UE for a physical uplink control channel, selecting one of a set of multiple serving cells to transmit feedback information for a downlink transmission, where the selecting is based on carrier switching being enabled at the UE and receiving a physical downlink control channel that lacks an indication of how to perform the carrier switching, and transmitting, to the network entity, the feedback information for the downlink transmission in accordance with the selecting.

An apparatus for wireless communication is described. The apparatus may include a processor, memory coupled with the processor, and instructions stored in the memory. The instructions may be executable by the processor to cause the apparatus to identify that carrier switching is enabled at the UE for a physical uplink control channel, select one of a set of multiple serving cells to transmit feedback information for a downlink transmission, where the selecting is based on carrier switching being enabled at the UE and receiving a physical downlink control channel that lacks an indication of how to perform the carrier switching, and transmit, to the network entity, the feedback information for the downlink transmission in accordance with the selecting.

Another apparatus for wireless communication at a UE is described. The apparatus may include means for identifying that carrier switching is enabled at the UE for a physical uplink control channel, means for selecting one of a set of multiple serving cells to transmit feedback information for a downlink transmission, where the selecting is based on carrier switching being enabled at the UE and receiving physical downlink control channel that lacks an indication of how to perform the for carrier switching, and means for transmitting, to the network entity, the feedback information for the downlink transmission in accordance with the selecting.

A non-transitory computer-readable medium storing code for wireless communication at a UE is described. The code may include instructions executable by a processor to identify that carrier switching is enabled at the UE for a physical uplink control channel, select one of a set of multiple serving cells to transmit feedback information for a downlink transmission, where the selecting is based on carrier switching being enabled at the UE and receiving a physical downlink control channel that lacks an indication of how to perform the carrier switching, and transmit, to the network entity, the feedback information for the downlink transmission in accordance with the selecting.

In some examples of the method, apparatuses, and non-transitory computer-readable medium described herein, selecting one of the set of multiple serving cells may include operations, features, means, or instructions for selecting a primary serving cell of the UE to transmit the feedback information for the downlink transmission.

Some examples of the method, apparatuses, and non-transitory computer-readable medium described herein may further include operations, features, means, or instructions for identifying, for the primary serving cell, a scheduling conflict between uplink transmission of the feedback information and a downlink reception, scanning, according to a predefined ordering associated with the carrier switching time pattern configured for the UE, remaining serving cells of the set of multiple serving cells for the availability of uplink resources to transmit the feedback information, and selecting the secondary serving cell in accordance with the availability of uplink resources on the secondary serving cell.

In some examples of the method, apparatuses, and non-transitory computer-readable medium described herein, selecting one of the set of multiple serving cells may include operations, features, means, or instructions for identifying that a radio resource control signal includes an indication of a carrier switching time pattern and selecting a primary serving cell or a secondary serving cell to transmit the feedback information based on identifying the carrier switching time pattern.

In some examples of the method, apparatuses, and non-transitory computer-readable medium described herein, selecting one of the set of multiple serving cells may include operations, features, means, or instructions for identifying that a radio resource control configuration of the UE does not include a carrier switching time pattern and selecting a primary serving cell of the UE to transmit the feedback information based on identifying that the radio resource control configuration does not include the carrier switching time pattern.

In some examples of the method, apparatuses, and non-transitory computer-readable medium described herein, selecting one of the set of multiple serving cells may include operations, features, means, or instructions for identifying that a radio resource control configuration of the UE includes a carrier switching time pattern, identifying that the physical downlink control channel may be received in a UE-specific search space, and selecting a secondary serving cell to transmit the feedback information based on identifying that the radio resource control configuration the carrier switching time pattern and that the physical downlink control channel may be received in the UE-specific search space.

In some examples of the method, apparatuses, and non-transitory computer-readable medium described herein, selecting one of the set of multiple serving cells may include operations, features, means, or instructions for identifying that a radio resource control configuration of the UE includes a carrier switching time pattern, identifying that the physical downlink control channel may be not received in a UE-specific search space, and selecting a primary serving cell to transmit the feedback information based on identifying that the radio resource control configuration includes the carrier switching time pattern and that the physical downlink control channel may be received in the UE-specific search space. In some examples of the method, apparatuses, and non-transitory computer-readable medium described herein, the indication of how to perform the carrier switching includes a downlink control information (DCI) format 1_0, or 1_1, or 1_2.

A method for wireless communication at a network entity is described. The method may include identifying that carrier switching is enabled at a UE for a physical uplink control channel, transmitting, to the UE, a physical downlink control channel that does not include an indication for how to perform the carrier switching, and receiving, from the UE, feedback information for a downlink transmission, where the feedback information is received on one of a set of multiple serving cells configured for the UE based on carrier switching being enabled at the UE and the physical downlink control channel.

An apparatus for wireless communication is described. The apparatus may include a processor, memory coupled with the processor, and instructions stored in the memory. The instructions may be executable by the processor to cause the apparatus to identify that carrier switching is enabled at a UE for a physical uplink control channel, transmit, to the UE, a physical downlink control channel that does not include an indication for how to perform the carrier switching, and receive, from the UE, feedback information for a downlink transmission, where the feedback information is received on one of a set of multiple serving cells configured for the UE based on carrier switching being enabled at the UE and the physical downlink control channel.

Another apparatus for wireless communication at a network entity is described. The apparatus may include means for identifying that carrier switching is enabled at a UE for a physical uplink control channel, means for transmitting, to the UE, a physical downlink control channel that does not include an indication for how to perform the carrier switching, and means for receiving, from the UE, feedback information for a downlink transmission, where the feedback information is received on one of a set of multiple serving cells configured for the UE based on carrier switching being enabled at the UE and the physical downlink control channel.

A non-transitory computer-readable medium storing code for wireless communication at a network entity is described. The code may include instructions executable by a processor to identify that carrier switching is enabled at a UE for a physical uplink control channel, transmit, to the UE, a physical downlink control channel that does not include an indication for how to perform the carrier switching, and receive, from the UE, feedback information for a downlink transmission, where the feedback information is received on one of a set of multiple serving cells configured for the UE based on carrier switching being enabled at the UE and the physical downlink control channel.

In some examples of the method, apparatuses, and non-transitory computer-readable medium described herein, receiving the feedback information may include operations, features, means, or instructions for receiving the feedback information on a primary serving cell of the set of multiple serving cells.

In some examples of the method, apparatuses, and non-transitory computer-readable medium described herein, receiving the feedback information may include operations, features, means, or instructions for identifying that a radio resource control signal includes an indication of a carrier switching time pattern and receiving the feedback information on a primary serving cell or a secondary serving cell a secondary serving cell based on identifying that the radio resource control signal includes the indication of the carrier switching time pattern.

In some examples of the method, apparatuses, and non-transitory computer-readable medium described herein, receiving the feedback information may include operations, features, means, or instructions for identifying that a radio resource control signal does not include an indication of a carrier switching time pattern and receiving the feedback information on a primary serving cell based on identifying that the radio resource control signal does not include the indication of the carrier switching time pattern.

In some examples of the method, apparatuses, and non-transitory computer-readable medium described herein, receiving the feedback information may include operations, features, means, or instructions for identifying that a radio resource control signal includes an indication of a carrier switching time pattern, identifying that the physical downlink control channel may be transmitted in a UE-specific search space, and receiving the feedback information on a secondary serving cell based on identifying that the radio resource control signal includes the indication of the carrier switching time pattern and that the physical downlink control channel may be transmitted in the UE-specific search space.

In some examples of the method, apparatuses, and non-transitory computer-readable medium described herein, receiving the feedback information may include operations, features, means, or instructions for identifying that a radio resource control signal includes an indication of a carrier switching time pattern, identifying that the physical downlink control channel may be not transmitted in a UE-specific search space, and receiving the feedback information on a primary serving cell based on identifying that the radio resource control signal includes the indication of the carrier switching time pattern and that the physical downlink control channel may be transmitted in the UE-specific search space. In some examples of the method, apparatuses, and non-transitory computer-readable medium described herein, the indication of how to perform the carrier switching includes a DCI format 1_0, or 1_1, or 1_2.

6

Figure 12:
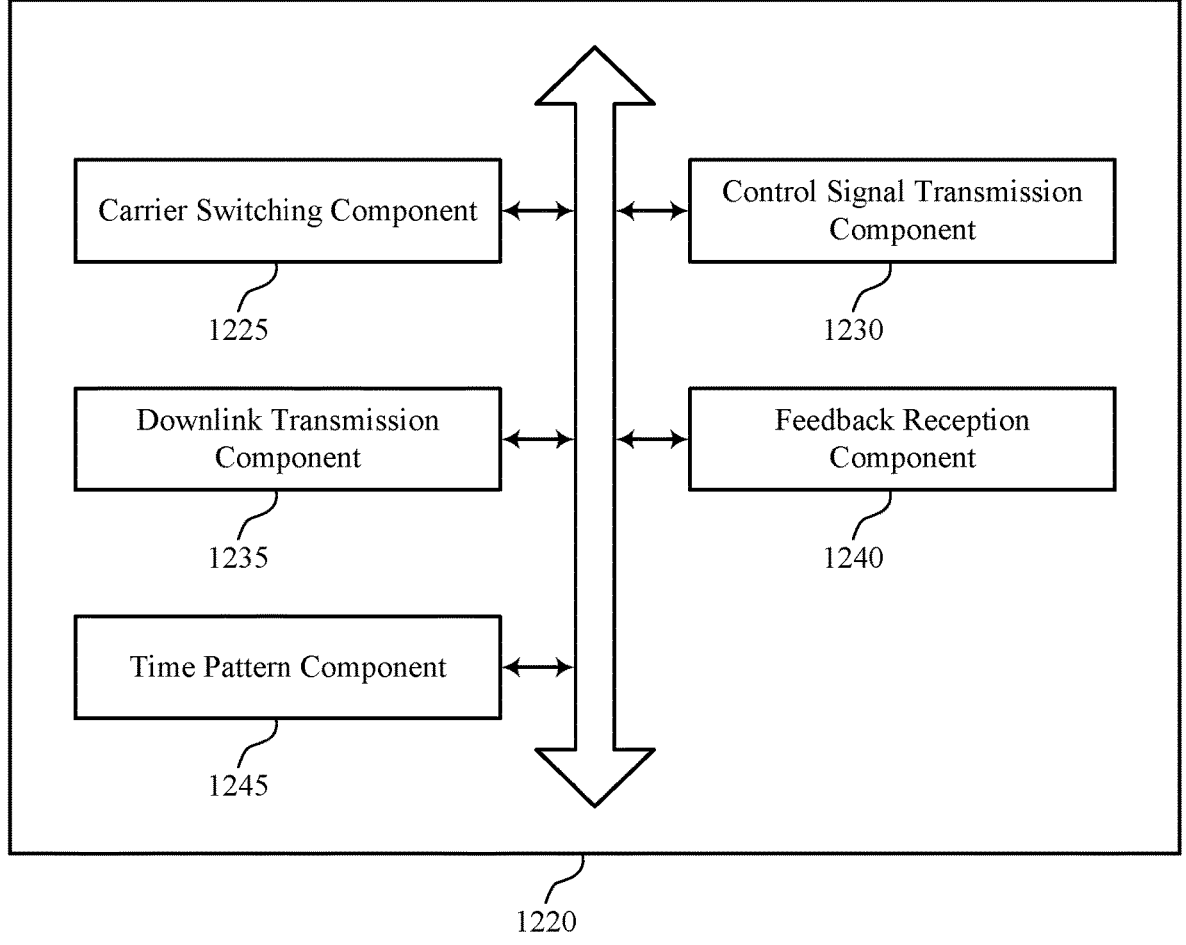

FIG. 12 shows a block diagram of a communications manager that supports performing carrier switching with fallback control information in accordance with examples as disclosed herein.

Figure 13:
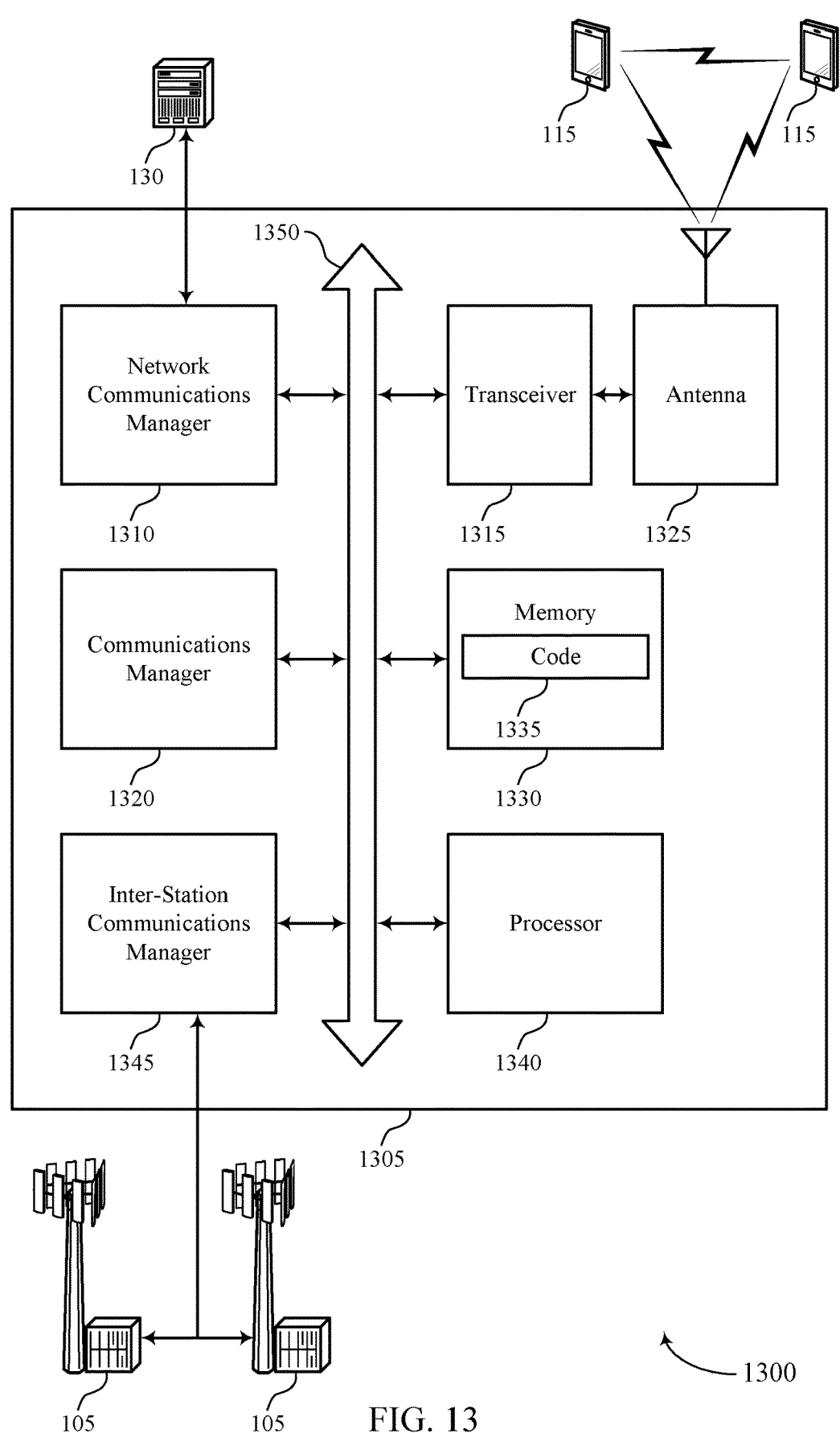

FIG. 13 shows a diagram of a system including a device that supports performing carrier switching with fallback control information in accordance with examples as disclosed herein.

FIGS. 14 through 17 show flowcharts illustrating methods that support performing carrier switching with fallback control information in accordance with examples as disclosed herein.

DETAILED DESCRIPTION

In wireless communications systems, a network entity may transmit downlink transmissions to a user equipment (UE), and the UE may be configured with time and frequency resources for receiving the downlink transmissions. In some examples, a network entity may schedule the transmissions via a radio resource control signaling (e.g., during a radio resource control configuration period) and may periodically transmit the downlink transmissions to the UE in accordance with the radio resource control signaling. A network entity may configure a UE to transmit physical uplink control channel transmissions on a physical uplink control channel group that includes a primary serving cell and one or more secondary serving cells. For instance, the network entity may configure the UE to transmit feedback information (e.g., hybrid automatic repeat request (HARQ) acknowledgment (ACK) or negative acknowledgment (NACK) feedback) for the downlink transmissions. The UE may receive a downlink transmission and may transmit feedback on one or more uplink symbols using an physical uplink control channel. Transmitting physical uplink control channel transmissions on multiple serving cells (e.g., a primary serving cell and one or more serving cells) may also be referred to herein as physical uplink control channel carrier switching.

In some examples, the network entity may configure the UE to transmit the feedback on different component carriers rather than delaying transmission of the feedback to a subsequent slot on the primary component carrier. For dynamic switching of carriers, a control signal (e.g., dynamic control information) may include a new field to indicate a target component carrier for transmitting a feedback in response to a downlink transmission. In some cases, however, the UE may receive a control signal and may not be able to identify a slot for transmitting feedback—because the control signal lacks a carrier switching indication (e.g., a field in the control signal) of the slot. Instead, the UE may delay transmission of the feedback to a subsequent slot in the primary component carrier, which may increase the latency of feedback reporting.

To reduce feedback reporting latency, the network entity may configure the UE to transmit the feedback according to different techniques. For a first technique, the UE may determine that a control signal scheduling a downlink transmission lacks an indication (e.g., a field in the control signal) for carrier switching. In such cases, the UE may transmit the feedback on the primary component carrier. For a second technique, the UE may determine that a radio resource control includes a carrier switch time pattern. In such cases, the UE may use a secondary component carrier according to the carrier switch time pattern to transmit the feedback. If the UE determines that the radio resource control lacks the carrier switch time pattern, then the UE may use the primary component carrier to transmit the feedback. For a third technique, the UE may determines that the radio resource control includes the carrier switch time pattern and that the control signal is received in a UE-specific carrier space. In that case, the UE may use a secondary component carrier to transmit the feedback. On the other hand, if the UE determines that the radio resource control includes the carrier switch time pattern and that the control signal is not received in a UE-specific carrier space, then the UE may use the primary component carrier to transmit the feedback.

UEs supporting techniques for performing carrier switching with fallback control information depicted herein may utilize the techniques described herein to experience power savings and extended battery life while ensuring reliable and efficient communications. Particular aspects of the subject matter described in this disclosure may be implemented to support high reliability and low latency communications, among other examples. The described techniques may thus include features for improvements to power consumption, spectral efficiency, higher data rates and, in some examples, may promote efficiency for high reliability and low latency operations, among other benefits.

Aspects of the disclosure are initially described in the context of wireless communications systems. Aspects of the disclosure are further illustrated and described with reference to a communications scheme and process flows. Aspects of the disclosure are further illustrated by and described with reference to apparatus diagrams, system diagrams, and flowcharts that relate to performing carrier switching with fallback control information.

Figure 1:
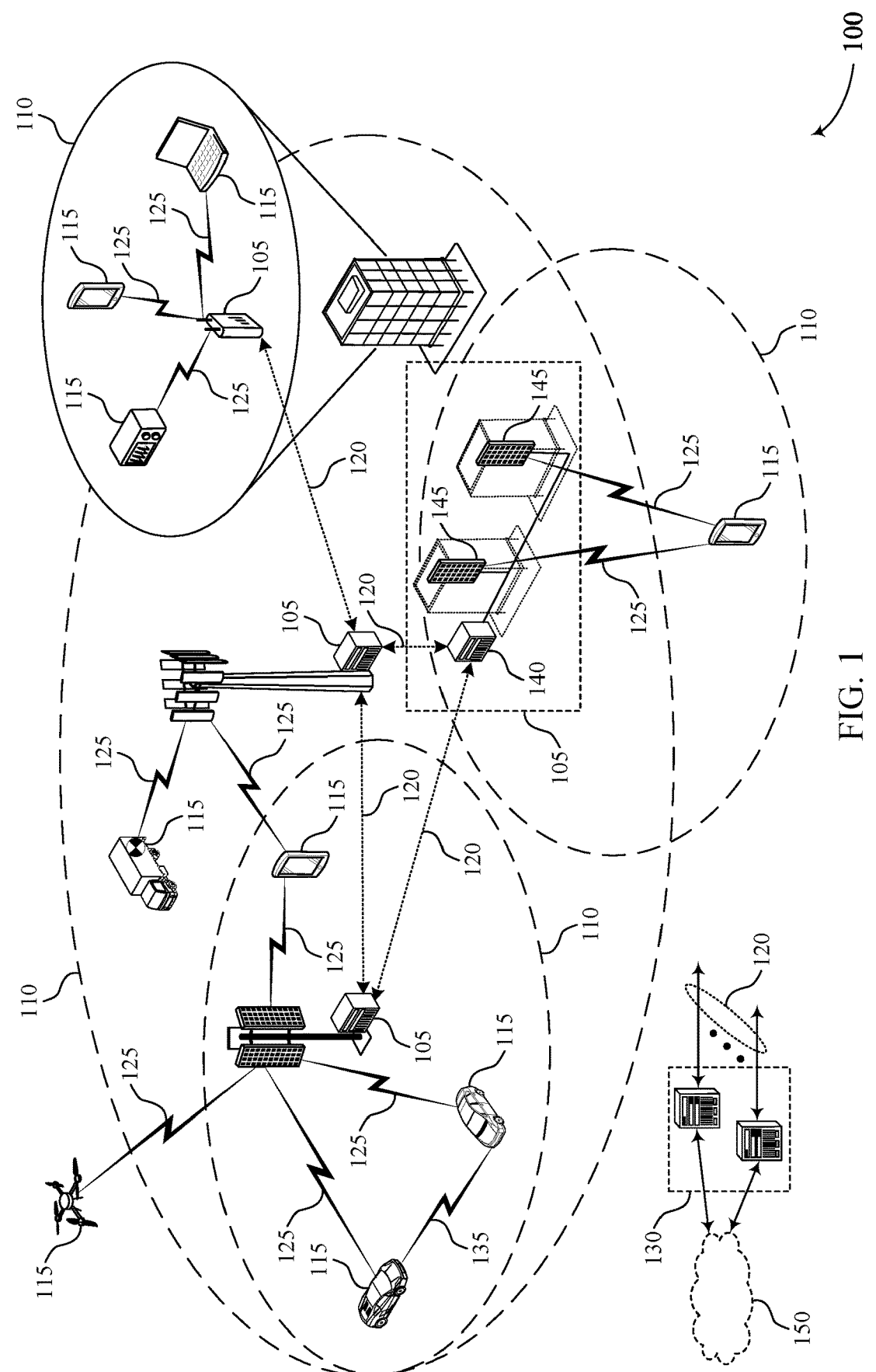
FIG. 1 illustrates an example of a wireless communications system that supports performing carrier switching with fallback control information in accordance with examples as disclosed here.

FIG. 1 illustrates an example of a wireless communications system 100 that supports performing carrier switching with fallback control information in accordance with examples as disclosed herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the radio resource control protocol layer may provide establishment, configuration, and maintenance of a radio resource control connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects depicted herein, a UE 115 may identify that carrier switching is enabled at the UE 115 for a physical uplink control channel and may receive a control signal that lacks an indication (e.g., a field in the control signal) for carrier switching. The UE 115 may monitor for a downlink transmission on a primary serving cell of a set of serving cells in a physical uplink control channel group. The UE 115 may then select one of the set of serving cells to transmit feedback information for the downlink transmission, wherein the selecting is based on carrier switching being enabled at the UE while the control signal lacks the indication for carrier switching. Upon selecting a serving cell, the UE 115 may transmit, to the network entity 105, the feedback information for the downlink transmission. In some examples, the UE 115 may identify whether a radio resource control signal includes an indication of a carrier switching time pattern. The UE 115 may select a secondary serving cell to transmit the feedback information based on identifying that the radio resource control signal includes the indication of the carrier switching time pattern. Alternatively, the UE 115 may select the primary serving cell to transmit the feedback information based on identifying that the radio resource control signal does not include the indication of the carrier switching time pattern.

Figure 2:
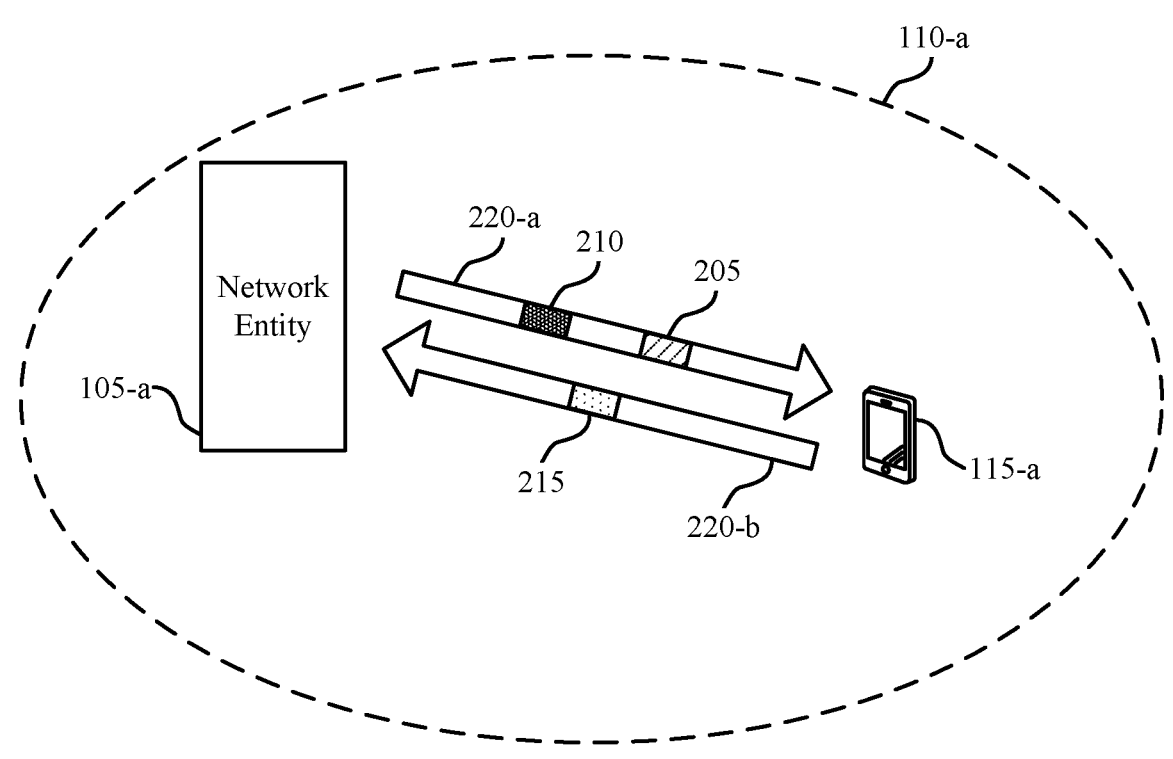
FIG. 2 illustrates an example of a wireless communications system that supports performing carrier switching with fallback control information in accordance with examples as disclosed herein.

FIG. 2 illustrates an example of a wireless communications system 200 that supports performing carrier switching with fallback control information in accordance with examples as disclosed herein. The wireless communications system 200 may implement or be implemented by aspects of wireless communications system 100. For example, the wireless communications system 200 may include a UE 115-*a* and a network entity 105-*a*, which may be examples of corresponding devices described with reference to FIG. 1. The UE 115-*a* and the network entity 105-*a* may communicate over a communication link 220-*a* (e.g., a downlink) and a communication link 220-*b* (e.g., an uplink), which may be examples of a communication link 125 described with reference to FIG. 1. The UE 115-*a* and the network entity 105-*a* may communicate within a geographic coverage area 110-*a* of the network entity 105-*a*, which may be an example of a geographic coverage area 110 described with reference to FIG. 1. In the wireless communications system 200, the UE 115-*a* may use physical uplink control channel carrier switching and feedback deferral techniques to transmit feedback information 215 to the network entity 105-*a*.

In some examples, the UE 115-*a* may receive a downlink transmission and may transmit feedback on one or more uplink symbols after receiving the downlink transmission. For example, if the network entity 105-*a* transmits a downlink transmission to the UE 115-*a* in a first slot, the network entity 105-*a* may configure the UE 115-*a* to transmit feedback information for the transmission in a target slot that is subsequent to the first slot. In some cases, the network entity 105-*a* may transmit the transmission to the UE 115-*a* on a primary serving cell (e.g., a primary component carrier) and may configure the UE 115-*a* to transmit the feedback information to the network entity 105-*a*.

In some cases, however, a TDD configuration may prevent the UE 115-*a* from transmitting the feedback information to the network entity 105-*a* in the target slot. For example, if the target slot is designated as a downlink slot, the UE 115-*a* may be unable to transmit the feedback information in the target slot. In other words, there may be insufficient available uplink resources for the UE to transmit the feedback information in the target slot. In such cases, the UE 115-*a* may defer (e.g., delay) transmission of the feedback information to a subsequent second slot. Deferring transmission of the feedback information may increase the latency associated with reporting the feedback information to the network entity.

To reduce feedback deferral latency, the UE 115-*a* may transmit the feedback information based on attempting to defer transmission of the feedback information to a different serving cell prior to deferring transmission of the feedback information to the subsequent second slot on the primary serving cell. For example, if there are insufficient available uplink resources for the UE to transmit the feedback information in the primary serving cell (e.g., if the UE identifies a scheduling conflict associated with the target slot on the primary serving cell) but there are sufficient available uplink resources for transmission of the feedback information on a secondary serving cell, the UE may transmit the feedback information on the secondary serving cell. As a result, the UE may avoid incurring additional latency associated with delaying transmission of the feedback information to the subsequent second slot.

In some examples, the UE may select the secondary serving cell from a physical uplink control channel group that includes a primary serving cell (e.g., a primary component carrier and one or more secondary serving cells (e.g., secondary component carriers). Additionally or alternatively, the UE may select one of the serving cells based on a time pattern associated with the physical uplink control channel group. In TDD configuration uplink carrier aggregation (where all component carriers in a physical uplink control channel group are TDD configuration carriers), the network entity 105-*a* may configure the TDD configuration pattern in a staggering or complementary manner. The UE 115-*a* and the network entity 105-*a* may support two carrier switch modes: a semi-static switch mode and a dynamic switch mode. For the semi-static switch mode, the UE 115-*a* may transmit a feedback without a control indication. In such cases, the network entity 105-*a* may indicate a component carrier switch time pattern via a radio resource control configuration. For the dynamic switch mode, the UE 115-*a* may transmit a feedback with a control indication. In such cases, the control indication may include a field (e.g., cell field indicator) indicating the component carrier switch time pattern. In some cases, however, the control signal may lack a carrier switching indication. In such cases, the UE 115-*a* may receive a control signal and may not be able to identify a slot for transmitting feedback. Instead, the UE 115-*a* may delay transmission of the feedback to a subsequent slot in the primary component carrier, which may increase the latency of feedback reporting.

Aspects of the present disclosure provide for techniques to select one of the secondary serving cells for feedback transmission when a control signal (e.g., DCI format 1_0, or 1_1, or 1_2) lacks a carrier switching indication (e.g., a field in the control signal). In the wireless communications system 200, the network entity 105-*a* may transmit control signaling 205 to the UE 115-*a*. The control signaling 205 may include radio resource control signaling, dynamic signaling (e.g., downlink control information, MAC-control elements, or both). A physical downlink control channel (PDCCH) may carry the dynamic signaling (e.g., downlink control information). In some examples, carrier switching may be enabled at the UE 115-*a* for a physical uplink control channel. The control signaling 205 may schedule a downlink transmission 210 from the network entity 105-*a* to the UE 115-*a* in a first slot. In some cases, the control signaling 205 may lack an indication for carrier switching. The UE 115-*a* may receive the downlink transmission 210 on a primary component carrier. In some cases, the UE 115-*a* may be unable to transmit the feedback information 215 in the primary component carrier. For example, there may be a scheduling conflict with a target slot that prevents the UE 115-*a* from transmitting the feedback information 215 in the primary component carrier.

In accordance with examples as disclosed herein, the UE 115-*a* may use one or more feedback deferral techniques to transmit the feedback information 215 in a slot with available uplink resources. The UE 115-*a* may select one of a set of serving cells (including the primary component carrier and one or more secondary component carriers) to transmit feedback information for the downlink transmission. In some examples, the selecting may be based on carrier switching being enabled at the UE 115-*a* while the control signal lacks the indication (e.g., a field) for carrier switching. In some examples, the UE 115-*a* may determine whether a radio resource control signal includes an indication of a carrier switching time pattern.

The UE 115-*a* may select the primary component carrier to transmit the feedback information 215 based on identifying that the radio resource control signal does not include the indication of the carrier switching time pattern. Alternatively, the UE 115-*a* may select a secondary component carrier to transmit the feedback information 215 based on identifying that the radio resource control signal includes the indication of the carrier switching time pattern. In some examples, if the radio resource control signal includes the indication of the carrier switching time pattern, the UE 115-*a* may further determine whether the control signal is received in a UE-specific search space. The UE 115-*a* may select a secondary component carrier to transmit the feedback information based on identifying that the radio resource control signal includes the indication of the carrier switching time pattern and that the control signal is received in the UE-specific search space. Alternatively, the UE 115-*a* may select the primary component carrier to transmit the feedback information based on identifying that the radio resource control signal includes the indication of the carrier switching time pattern and that the control signal is received in the UE-specific search space.

Using carrier switching and feedback deferral techniques for control signal that lacks an indication for carrier switching may enable the UE 115-*a* to transmit the feedback information 215 to the network entity 105-*a* with reduced latency and increased efficiency, among other benefits. For example, the described techniques may enable the UE 115-*a* to transmit the feedback information 215 in the target slot on a different serving cell rather than delaying transmission of the feedback information 215 to a subsequent second slot on the same serving cell.

Figure 3:
FIG. 3 illustrates an example of a communications scheme that supports performing carrier switching with fallback control information in accordance with examples as disclosed herein.

FIG. 3 illustrates an example of a communications scheme 300 that supports performing carrier switching with fallback control information in accordance with examples as disclosed herein. The communications scheme 300 may implement or be implemented by aspects of the wireless communications system 100 or the wireless communications system 200. For example, the communications scheme 300 may be implemented by a UE 115 or a network entity 105, which may be examples of corresponding devices described with reference to FIGS. 1 and 2. In the communications scheme 300, the UE 115 may defer transmission of feedback information 310 from a slot 325-*b* to a slot 325-*c* based on a time pattern 330 and a TDD configuration of a primary serving cell 315-*a*.

In the example of FIG. 3, the network entity 105 may transmit a downlink transmission 305 to the UE 115. The network entity 105 may schedule the downlink transmission 305 via control signaling (which may include radio resource control signaling, downlink control information, and MAC-control elements). In some cases, a PDCCH may carry the control signaling. In some examples, the control signaling may also configure the UE 115 to transmit feedback information 310 for the downlink transmission 305. For example, the control signaling may indicate at least one of a timing offset 335 between reception of the downlink transmission 305 and transmission of the feedback information 310. In some examples, the UE 115 may be configured with a time pattern 330 associated with a physical uplink control channel group 320, a TDD configuration for each serving cell 315 in the physical uplink control channel group 320, or a combination thereof. The timing offset 335 may indicate a number of slots between a slot 325-*a* in which the network entity 105 transmits the downlink transmission 305 and a slot 325-*b* in which the UE 115 is scheduled to transmit the feedback information 310.

The time pattern 330 may indicate a target serving cell 315 (e.g., from the physical uplink control channel group 320) for each of the slots 325. For example, the time pattern may indicate that a secondary serving cell 315-*b* (e.g., secondary component carrier (SCC)-1) is the target serving cell 315 for slots 325-*a*, 325-*e*, and 325-*h*, a secondary serving cell 315-*c* (e.g., SCC-2) is the target serving cell 315 for slots 325-*b* and 325-*f*, and the primary serving cell 315-*a* (e.g., primary component carrier (PCC)) is the target serving cell 315 for slots 325-*c*, 325-*d*, and 325-*g*. Although illustrated with three serving cells 315 in the physical uplink control channel group 320, it is to be understood that the physical uplink control channel group 320 may include any number of serving cells 315. Likewise, it is to be understood that the time pattern 330 may include any number of target serving cells 315 arranged in any order.

The TDD configurations for the serving cells 315 may indicate slot types for each of the slots 325. For example, the TDD configuration of the primary serving cell 315-*a* may indicate that the slot 325-*a* is a downlink slot (e.g., a slot with downlink resources), the slot 325-*c* is a special slot (e.g., a slot with uplink resources and downlink resources), and the slot 325-*d* is an uplink slot (e.g., a slot with uplink resources). Although illustrated with a specific combination of uplink slots, downlink slots, and special slots, it is to be understood that the TDD configurations associated with the serving cells 315 may include any number of different slot types arranged in any combination.

In some cases, if the network entity 105 configures the UE 115 to transmit the feedback information 310 in the slot 325-*b* on the primary serving cell 315-*a* but the TDD configuration associated with the primary serving cell 315-*a* indicates that the slot 325-*b* is a downlink slot, the UE 115 may be unable to transmit the feedback information 310 in the slot 325-*b*. In other words, there may be insufficient available uplink resources for transmission of the feedback information 310 in the slot 325-*b* on the primary serving cell 315-*a*. In such cases, the UE 115 may defer transmission of the feedback information 310 to a different slot 325. For example, the UE 115 may defer transmission of the feedback information 310 to the slot 325-*c* because the slot 325-*c* has sufficient available uplink resources for transmission of the feedback information 310 on the primary serving cell 315-*a*. Deferring transmission of the feedback information 310 to the slot 325-*c*, as illustrated in FIG. 3, may increase the latency associated with reporting the feedback information 310 to the network entity 105.

In accordance with the described techniques, the UE 115 may transmit the feedback information 310 with reduced latency and greater efficiency based on using physical uplink control channel carrier switching in combination with feedback deferral techniques (as described with reference to FIGS. 1 and 2). The UE 115 may defer the feedback transmission if carrier switching is enabled at the UE 115. In some examples, a control signal scheduling the downlink transmission may not include an indication for carrier switching. In such cases, the UE 115 may either transmit the feedback on the primary serving cell 315-*a* or one of the secondary serving cells 315-*b* and 315-*c*, based on one or more techniques. In some examples, the UE 115 may select the primary serving cell 315-*a* to transmit the feedback information 310 based on identifying that a radio resource control signal does not include the indication of the carrier switching time pattern. Alternatively, the UE 115 may select a secondary serving cell 315-*b* or 315-*c* to transmit the feedback information 310 based on identifying that the radio resource control signal includes the indication of the carrier switching time pattern.

In some examples, if the radio resource control signal includes the indication of the carrier switching time pattern, the UE 115 may further determine whether the control signal is received in a UE-specific search space. The UE 115 may either select a primary serving cell 315-*a* or a secondary serving cell 315-*b* or 315-*c* to transmit the feedback information based on identifying that the radio resource control signal includes the indication of the carrier switching time pattern and determining whether the control signal is received in the UE-specific search space. In some examples, if neither the secondary serving cell 315-*b* nor the secondary serving cell 315-*c* have sufficient available uplink resources for transmission of the feedback information 310 in the slot 325-*b*, the UE 115 may trigger feedback deferral of the feedback information 310 to the slot 325-*c* and may perform another physical uplink control channel carrier switching procedure to determine if any serving cells 315 in the physical uplink control channel group 320 have sufficient available uplink resources for transmission of the feedback information 310 in the slot 325-*c*.

For example, if the UE 115 determines that there are insufficient available uplink resources for transmission of the feedback information 310 in the slot 325-*b* on the primary serving cell 315-*a* (e.g., the target serving cell 315 for the slot 325-*c*, as indicated in the time pattern 330), the UE 115 may scan other serving cells in the physical uplink control channel group 320 (e.g., the secondary serving cell 315-*b* and the secondary serving cell 315-*c*) prior to deferring transmission of the feedback information 310 to the slot 325-*c*. If the UE 115 determines that there are sufficient available uplink resources for transmission of the feedback information 310 in the slot 325-*b* (e.g., the target slot for the feedback information 310, as indicated by the timing offset 335) on either the secondary serving cell 315-*b* or the secondary serving cell 315-*c*, the UE 115 may defer transmission of the feedback information 310 to the secondary serving cell 315-*b* or the secondary serving cell 315-*c* (e.g., based on a preconfigured ordering for the serving cells 315). That is, the UE 115 may transmit the feedback information 310 in the slot 325-*b* on a different serving cell 315 rather than delaying transmission of the feedback information 310 to the slot 325-*c*. As a result, the UE 115 may transmit the feedback information 310 with reduced latency, among other benefits.

Figure 4:
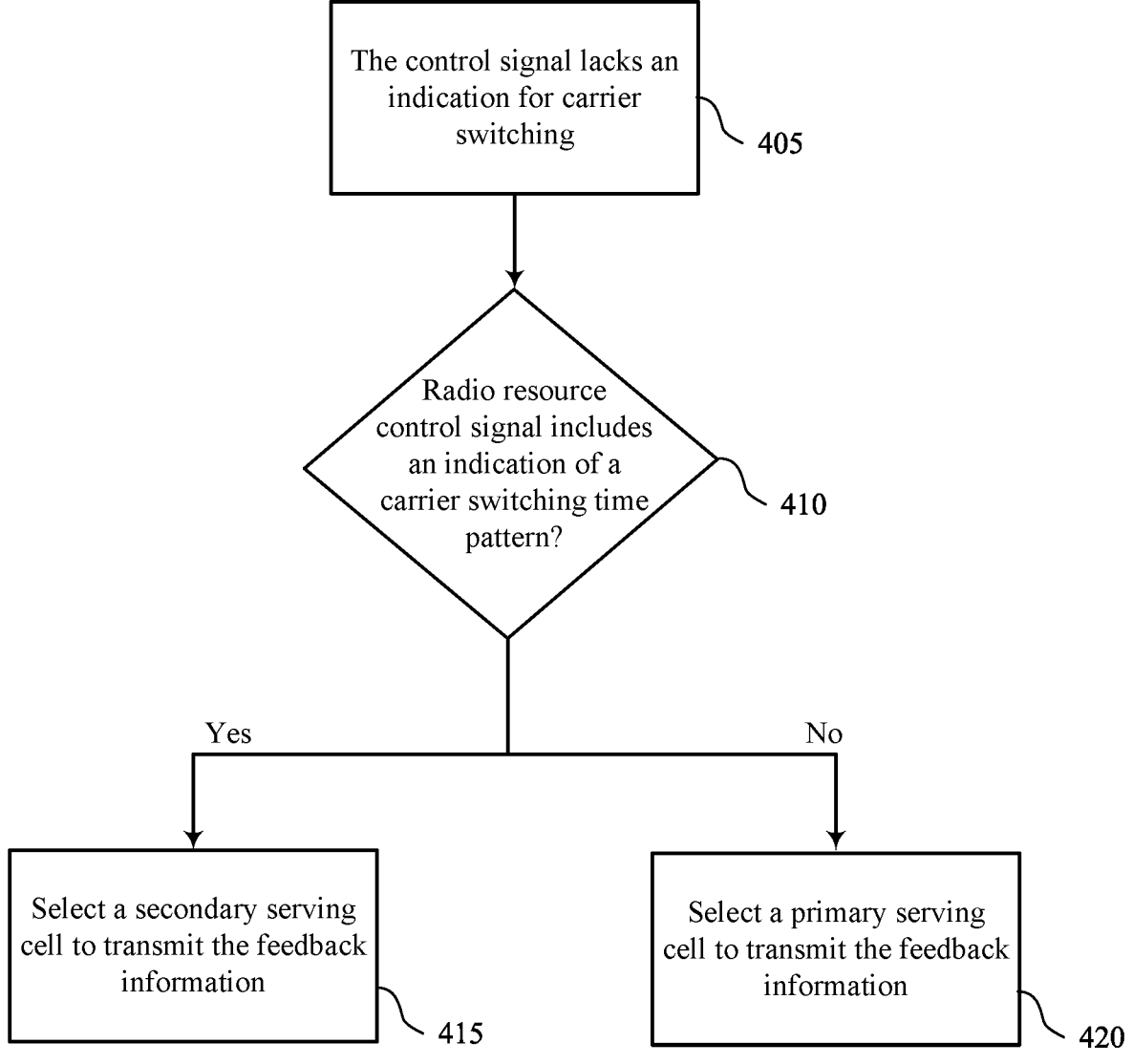
FIG. 4 illustrates an example of a process flow that supports performing carrier switching with fallback control information in accordance with examples as disclosed herein.

FIG. 4 illustrates an example of a process flow 400 that supports performing carrier switching with fallback control information in accordance with examples as disclosed herein. The process flow 400 may be implemented by one or more wireless devices, such as a UE, which may be an example of a UE 115 as described with reference to FIG. 1. In some examples, the process flow 400 may include one or more operations and procedures associated with the network entity 105 and UEs 115, which may be examples of those discussed with reference to FIGS. 2 and 3. While specific operations may be discussed below, the operations may be performed in a different order than the example order shown, or the operations performed by the devices may be performed by different devices or at different times.

At 405, the UE 115 may receive, from a network entity 105, a control signal that lacks an indication (e.g., a field in the control signal) for carrier switching. In some examples, the UE 115 may identify that carrier switching is enabled at the UE 115 for a physical uplink control channel. In some examples, the UE 115 may monitor for a downlink transmission on at least one serving cell (e.g., a primary serving cell) of a set of serving cells in a physical uplink control channel group. For example, the UE 115 may monitor for the downlink transmission of a primary component carrier.

At 410, the UE 115 may identify that a radio resource control signal includes an indication of a carrier switching time pattern. The UE 115 may select one of the set of serving cells to transmit feedback information for the downlink transmission, where the selecting is based on carrier switching being enabled at the UE while the control signal lacks the indication for carrier switching.

At 415, if the UE 115 determines that the radio resource control signal includes the indication of the carrier switching time pattern, then the UE 115 may select a secondary serving cell (e.g., secondary component carrier) to transmit the feedback information. At 420, if the UE 115 determines that the radio resource control signal does not include the indication of the carrier switching time pattern, then the UE 115 may select a primary serving cell (e.g., primary component carrier) to transmit the feedback information.

Figure 5:
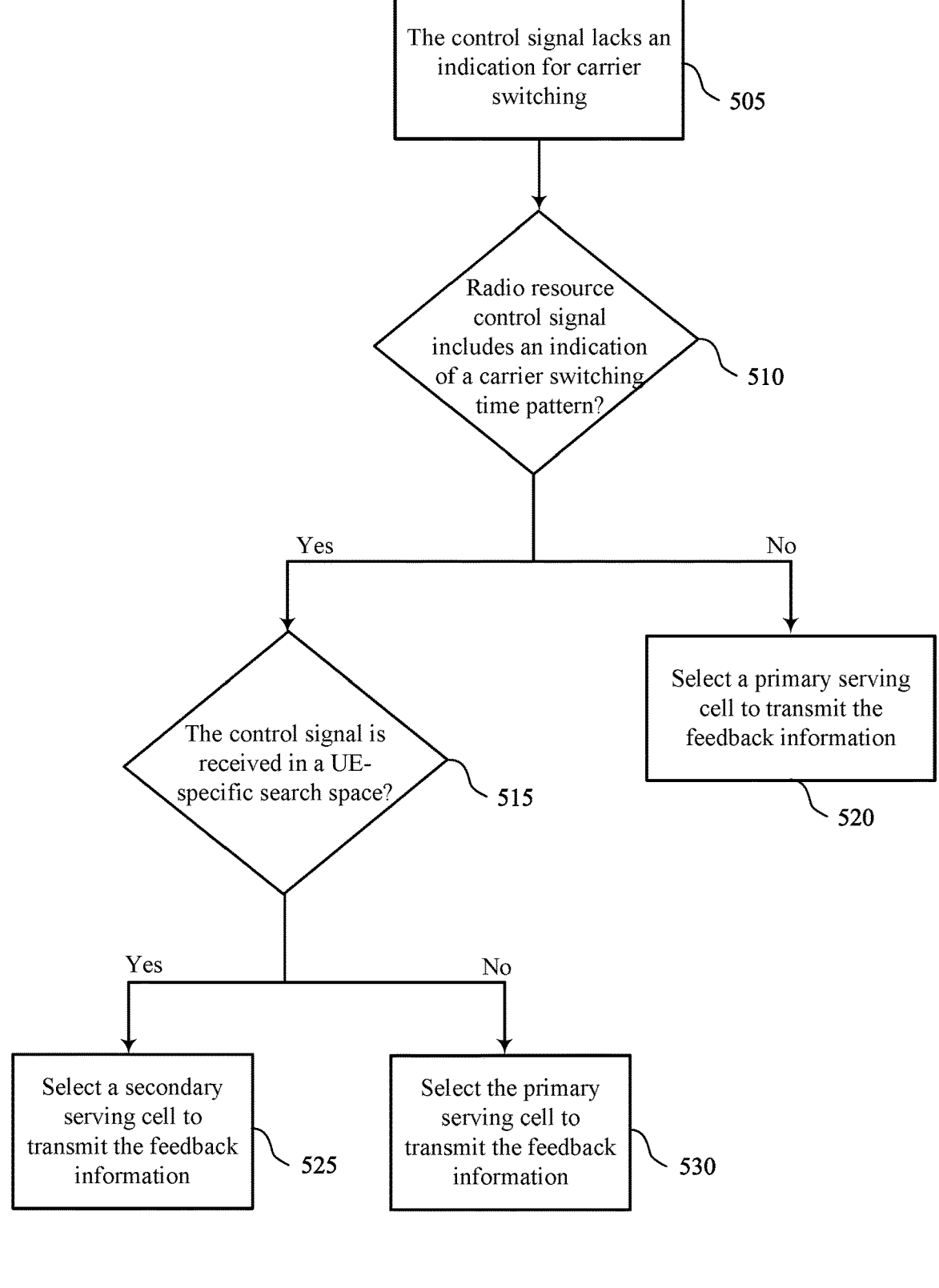
FIG. 5 illustrates an example of a process flow that supports performing carrier switching with fallback control information in accordance with examples as disclosed herein.

FIG. 5 illustrates an example of a process flow 500 that supports performing carrier switching with fallback control information in accordance with examples as disclosed herein. The process flow 500 may be implemented by one or more wireless devices, such as a UE, which may be an example of a UE 115 as described with reference to FIG. 1. In some examples, the process flow 500 may include one or more operations and procedures associated with the network entity 105 and UEs 115, which may be examples of those discussed with reference to FIGS. 2 and 3. While specific operations may be discussed below, the operations may be performed in a different order than the example order shown, or the operations performed by the devices may be performed by different devices or at different times.

At 505, the UE 115 may receive, from a network entity 105, a control signal that lacks an indication for carrier switching. In some examples, the UE 115 may identify that carrier switching is enabled at the UE 115 for a physical uplink control channel. In some examples, the UE 115 may monitor for a downlink transmission on a at least one serving cell (e.g., a primary serving cell) of a set of serving cells in a physical uplink control channel group. For example, the UE 115 may monitor for the downlink transmission of a primary component carrier.

At 510, the UE 115 may identify that a radio resource control signal includes an indication of a carrier switching time pattern. The UE 115 may select one of the set of serving cells to transmit feedback information for the downlink transmission, where the selecting is based on carrier switching being enabled at the UE while the control signal lacks the indication for carrier switching.

At 515, if the UE 115 determines that the radio resource control signal includes the indication of the carrier switching time pattern, then the UE 115 may determine whether the control signal is received in a UE-specific search space.

At 520, if the UE 115 determines that the radio resource control signal does not include the indication of the carrier switching time pattern, then the UE 115 may select a primary serving cell (e.g., primary component carrier) to transmit the feedback information.

At 525, if the UE 115 determines that the radio resource control signal includes the indication of the carrier switching time pattern and the control signal is received in the UE-specific search space, then the UE 115 may select a secondary serving cell (e.g., second component carrier) to transmit the feedback information.

At 530, if the UE 115 determines that the radio resource control signal includes the indication of the carrier switching time pattern but the control signal is not received in the UE-specific search space, then the UE 115 may select the primary serving cell (e.g., primary component carrier) to transmit the feedback information.

Figure 6:
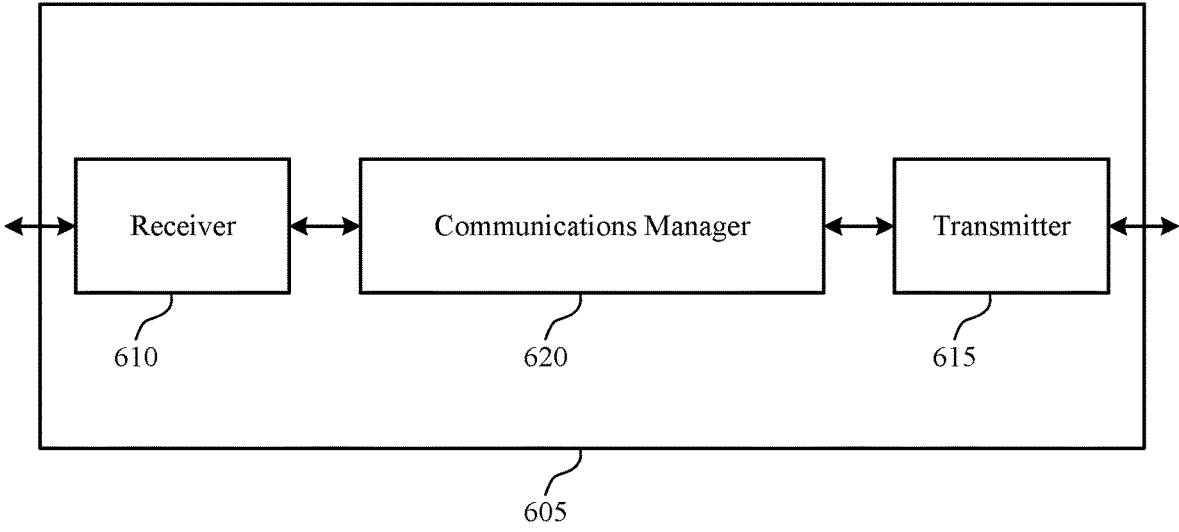
FIGS. 6 and 7 show block diagrams of devices that support performing carrier switching with fallback control information in accordance with examples as disclosed herein.

FIG. 6 shows a block diagram 600 of a device 605 that supports performing carrier switching with fallback control information in accordance with examples as disclosed herein. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to performing carrier switching with fallback control information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to performing carrier switching with fallback control information). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of performing carrier switching with fallback control information as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for identifying that carrier switching is enabled at the UE for a physical uplink control channel. The communications manager 620 may be configured as or otherwise support a means for receiving, from a network entity, a control signal that lacks an indication for carrier switching. The communications manager 620 may be configured as or otherwise support a means for monitoring for a downlink transmission on a primary serving cell of a set of multiple serving cells in a physical uplink control channel group. The communications manager 620 may be configured as or otherwise support a means for selecting one of the set of multiple serving cells to transmit feedback information for the downlink transmission, where the selecting is based on carrier switching being enabled at the UE and receiving a physical downlink control channel that lacks the indication of how to perform carrier switching. The communications manager 620 may be configured as or otherwise support a means for transmitting, to the network entity, the feedback information for the downlink transmission in accordance with the selecting.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
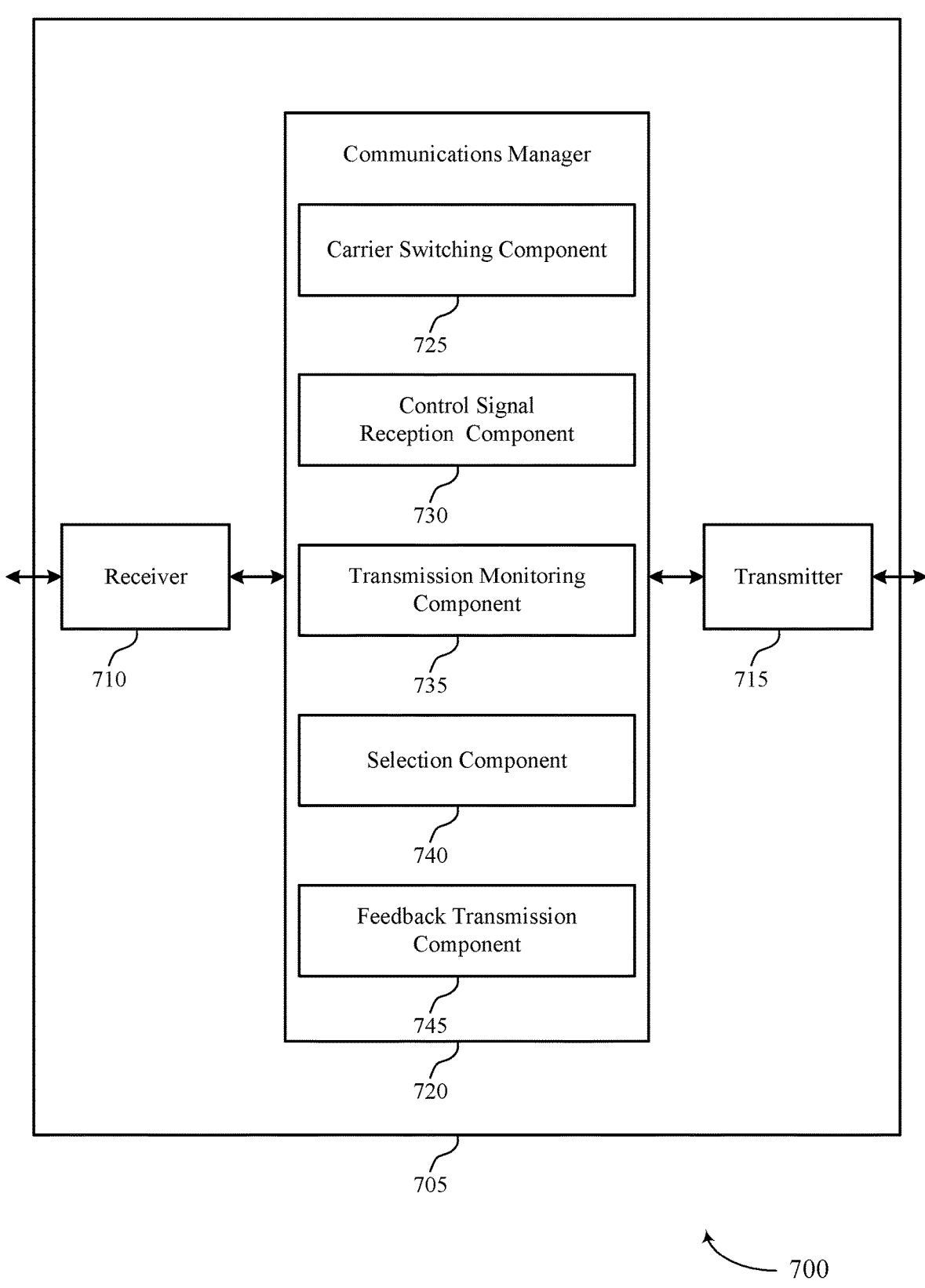

FIG. 7 shows a block diagram 700 of a device 705 that supports performing carrier switching with fallback control information in accordance with examples as disclosed herein. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to performing carrier switching with fallback control information). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to performing carrier switching with fallback control information). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of performing carrier switching with fallback control information as described herein. For example, the communications manager 720 may include a carrier switching component 725, a control signal reception component 730, a transmission monitoring component 735, a selection component 740, a feedback transmission component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The carrier switching component 725 may be configured as or otherwise support a means for identifying that carrier switching is enabled at the UE for a physical uplink control channel. The control signal reception component 730 may be configured as or otherwise support a means for receiving, from a network entity, a control signal that lacks an indication for carrier switching. The transmission monitoring component 735 may be configured as or otherwise support a means for monitoring for a downlink transmission on a primary serving cell of a set of multiple serving cells in a physical uplink control channel group. The selection component 740 may be configured as or otherwise support a means for selecting one of the set of multiple serving cells to transmit feedback information for the downlink transmission, where the selecting is based on carrier switching being enabled at the UE and receiving a physical downlink control channel that lacks the indication of how to perform carrier switching. The feedback transmission component 745 may be configured as or otherwise support a means for transmitting, to the network entity, the feedback information for the downlink transmission in accordance with the selecting.

Figure 8:
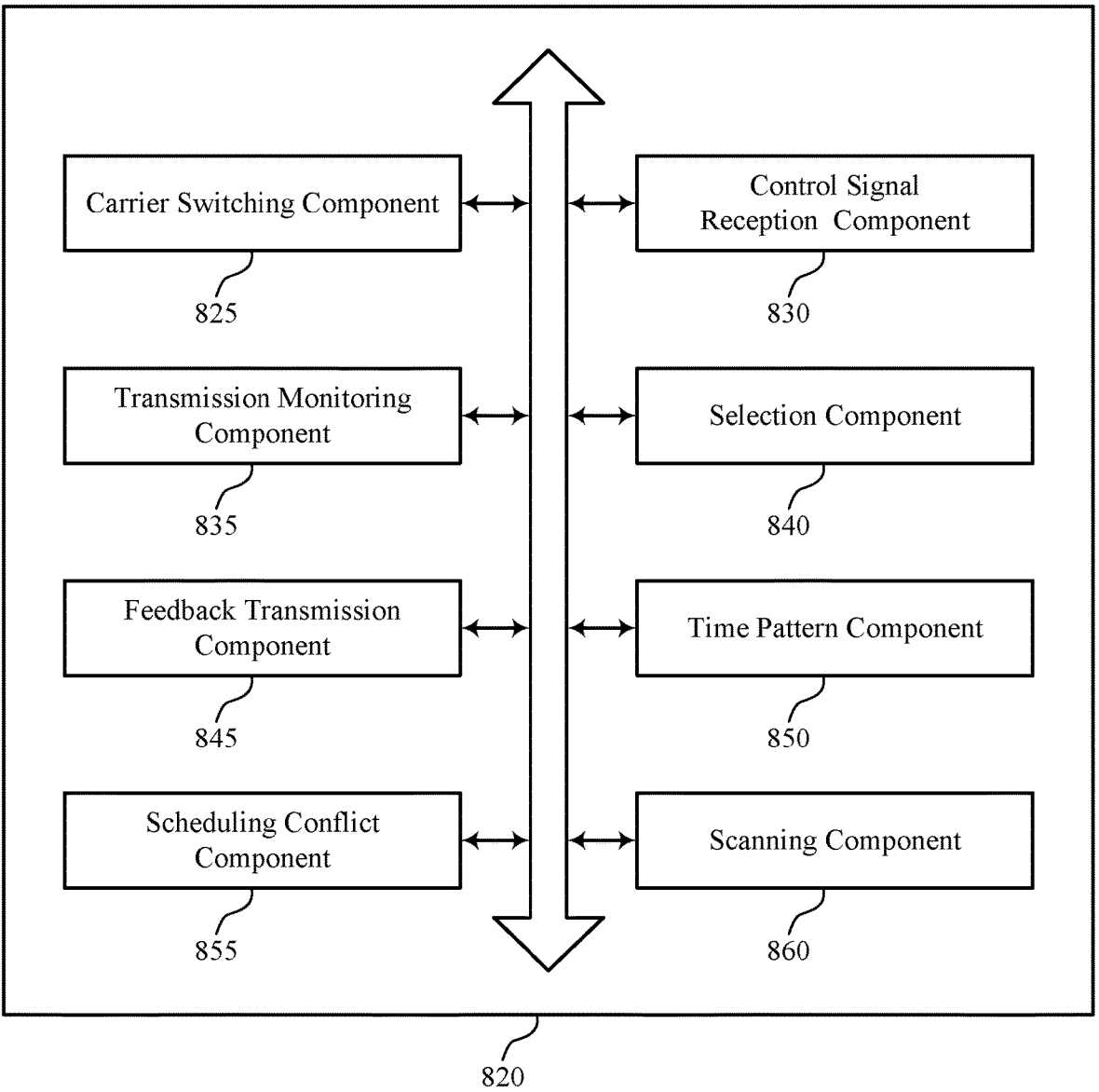
FIG. 8 shows a block diagram of a communications manager that supports performing carrier switching with fallback control information in accordance with examples as disclosed herein.

FIG. 8 shows a block diagram 800 of a communications manager 820 that supports performing carrier switching with fallback control information in accordance with examples as disclosed herein. The communications manager 820 may be an example of aspects of a communications manager 620, a communications manager 720, or both, as described herein. The communications manager 820, or various components thereof, may be an example of means for performing various aspects of performing carrier switching with fallback control information as described herein. For example, the communications manager 820 may include a carrier switching component 825, a control signal reception component 830, a transmission monitoring component 835, a selection component 840, a feedback transmission component 845, a time pattern component 850, a scheduling conflict component 855, a scanning component 860, or any combination thereof. Each of these components may communicate, directly or indirectly, with one another (e.g., via one or more buses).

The communications manager 820 may support wireless communication at a UE in accordance with examples as disclosed herein. The carrier switching component 825 may be configured as or otherwise support a means for identifying that carrier switching is enabled at the UE for a physical uplink control channel. The control signal reception component 830 may be configured as or otherwise support a means for receiving, from a network entity, a control signal that lacks an indication for carrier switching. The transmission monitoring component 835 may be configured as or otherwise support a means for monitoring for a downlink transmission on a primary serving cell of a set of multiple serving cells in a physical uplink control channel group. The selection component 840 may be configured as or otherwise support a means for selecting one of the set of multiple serving cells to transmit feedback information for the downlink transmission, where the selecting is based on carrier switching being enabled at the UE and receiving a physical downlink control channel that lacks the indication of how to perform carrier switching. The feedback transmission component 845 may be configured as or otherwise support a means for transmitting, to the network entity, the feedback information for the downlink transmission in accordance with the selecting.

In some examples, to support selecting one of the set of multiple serving cells, the selection component 840 may be configured as or otherwise support a means for selecting a primary serving cell of the UE to transmit the feedback information for the downlink transmission.

In some examples, to support selecting one of the set of multiple serving cells, the time pattern component 850 may be configured as or otherwise support a means for identifying that a radio resource control signal includes an indication of a carrier switching time pattern. In some examples, to support selecting one of the set of multiple serving cells, the selection component 840 may be configured as or otherwise support a means for selecting a primary serving cell or a secondary serving cell to transmit the feedback information based on identifying that the radio resource control signal includes the indication of the carrier switching time pattern.

In some examples, the scheduling conflict component 855 may be configured as or otherwise support a means for identifying, for the primary serving cell, a scheduling conflict between uplink transmission of the feedback information and a downlink reception. In some examples, the scanning component 860 may be configured as or otherwise support a means for scanning, according to a predefined ordering associated with the carrier switching time pattern configured for the UE, remaining serving cells of the set of multiple serving cells for the availability of uplink resources to transmit the feedback information, and selecting the secondary serving cell in accordance with the availability of uplink resources on the secondary serving cell.

In some examples, to support selecting one of the set of multiple serving cells, the time pattern component 850 may be configured as or otherwise support a means for identifying a carrier switching time pattern configured for the UE by radio resource control signaling. In some examples, to support selecting one of the set of multiple serving cells, the selection component 840 may be configured as or otherwise support a means for selecting a primary serving cell 1 or a secondary serving cell to transmit the feedback information based on identifying the carrier switching time pattern.

In some examples, to support selecting one of the set of multiple serving cells, the time pattern component 850 may be configured as or otherwise support a means for identifying that a radio resource control configuration of the UE does not include a carrier switching time pattern. In some examples, to support selecting one of the set of multiple serving cells, the selection component 840 may be configured as or otherwise support a means for selecting a primary serving cell of the UE to transmit the feedback information based on identifying that the radio resource control configuration does not include the carrier switching time pattern.

In some examples, to support selecting one of the set of multiple serving cells, the time pattern component 850 may be configured as or otherwise support a means for identifying that a radio resource control configuration of the UE includes a carrier switching time pattern. In some examples, to support selecting one of the set of multiple serving cells, the control signal reception component 830 may be configured as or otherwise support a means for identifying that the control signal is received in a UE-specific search space. In some examples, to support selecting one of the set of multiple serving cells, the selection component 840 may be configured as or otherwise support a means for selecting a secondary serving cell to transmit the feedback information based on identifying that the radio resource control configuration includes the indication of the carrier switching time pattern and that the control signal is received in the UE-specific search space.

In some examples, to support selecting one of the set of multiple serving cells, the time pattern component 850 may be configured as or otherwise support a means for identifying that a radio resource control configuration includes a carrier switching time pattern. In some examples, to support selecting one of the set of multiple serving cells, the control signal reception component 830 may be configured as or otherwise support a means for identifying that the control signal is not received in a UE-specific search space. In some examples, to support selecting one of the set of multiple serving cells, the selection component 840 may be configured as or otherwise support a means for selecting a primary serving cell to transmit the feedback information based on identifying the carrier switching time pattern and that the control signal is received in the UE-specific search space. In some examples, the indication of how to perform the carrier switching includes a DCI format 1_0, or 1_1, or 1_2.

Figure 9:
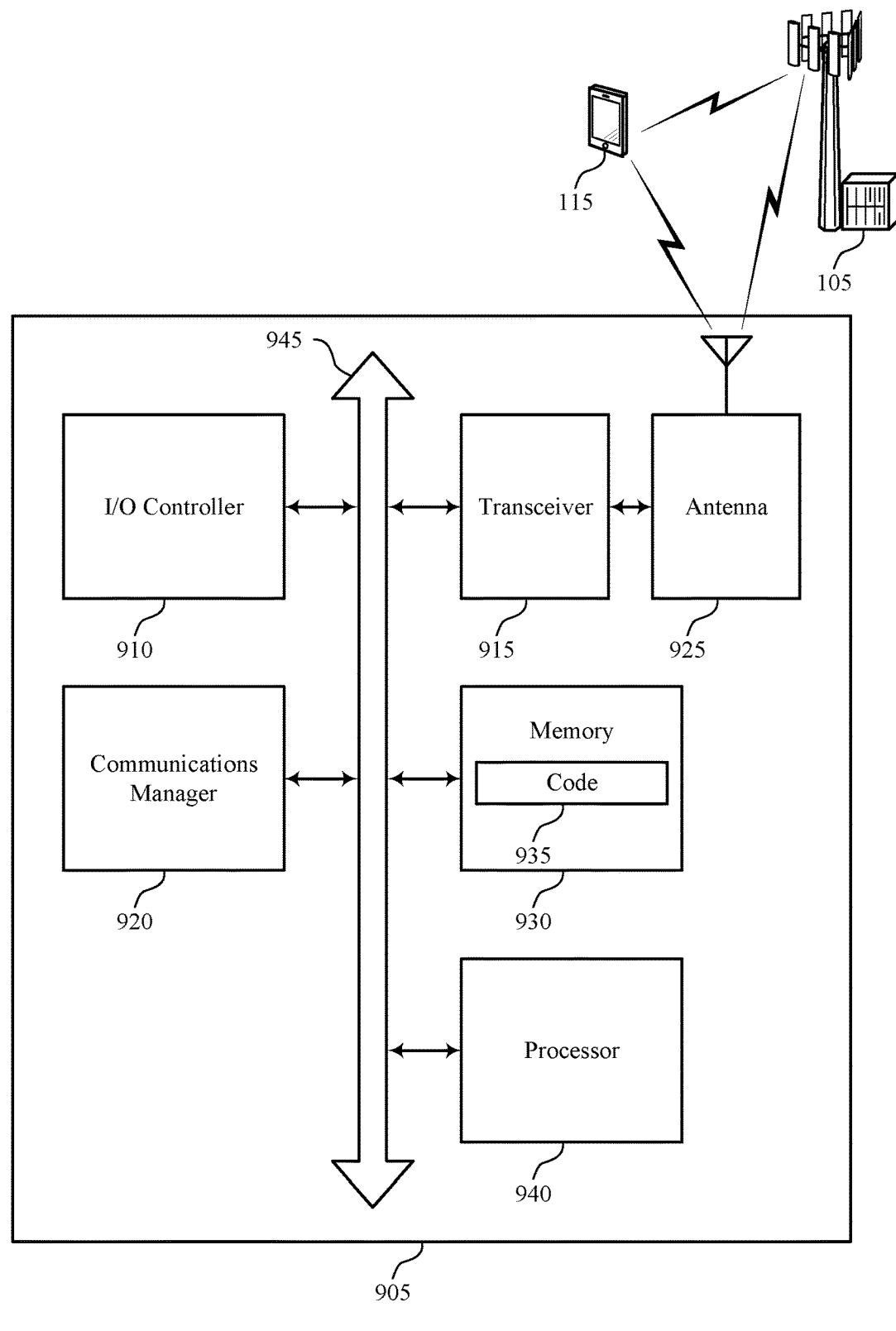
FIG. 9 shows a diagram of a system including a device that supports performing carrier switching with fallback control information in accordance with examples as disclosed herein.

FIG. 9 shows a diagram of a system 900 including a device 905 that supports performing carrier switching with fallback control information in accordance with examples as disclosed herein. The device 905 may be an example of or include the components of a device 605, a device 705, or a UE 115 as described herein. The device 905 may communicate wirelessly with one or more network entities 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting performing carrier switching with fallback control information). For example, the device 905 or a component of the device 905 may include a processor 940 and memory 930 coupled with the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying that carrier switching is enabled at the UE for a physical uplink control channel. The communications manager 920 may be configured as or otherwise support a means for receiving, from a network entity, a control signal that lacks an indication for carrier switching. The communications manager 920 may be configured as or otherwise support a means for monitoring for a downlink transmission on a primary serving cell of a set of multiple serving cells in a physical uplink control channel group. The communications manager 920 may be configured as or otherwise support a means for selecting one of the set of multiple serving cells to transmit feedback information for the downlink transmission, where the selecting is based on carrier switching being enabled at the UE and receiving a physical downlink control channel that lacks an indication of how to perform the carrier switching. The communications manager 920 may be configured as or otherwise support a means for transmitting, to the network entity, the feedback information for the downlink transmission in accordance with the selecting.

By including or configuring the communications manager 920 in accordance with examples as described herein, the device 905 may support techniques for improved communication reliability, reduced latency, improved user experience related to reduced processing, reduced power consumption, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of performing carrier switching with fallback control information as described herein, or the processor 940 and the memory 930 may be otherwise configured to perform or support such operations.

Figure 10:
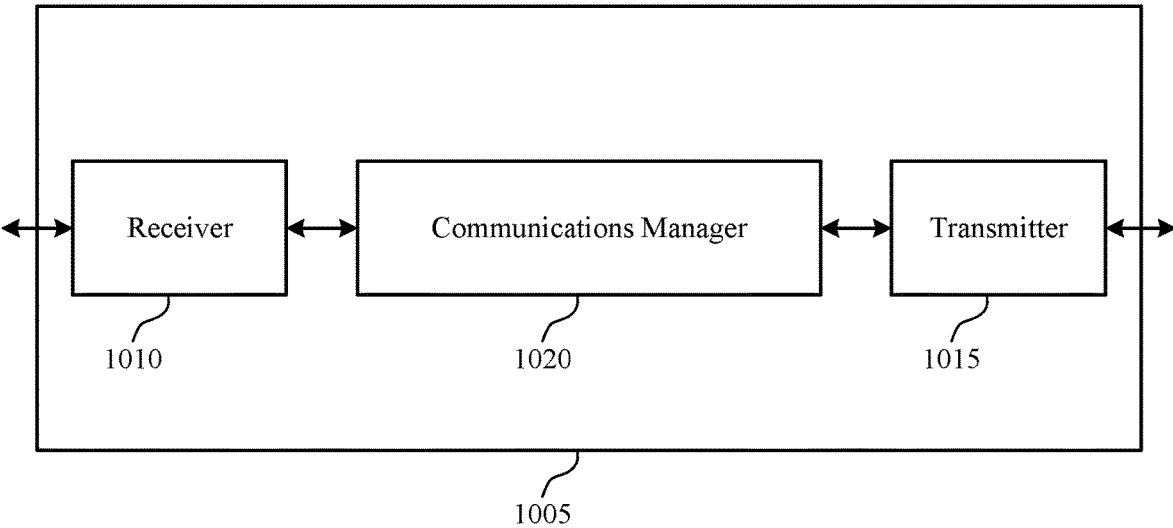
FIGS. 10 and 11 show block diagrams of devices that support performing carrier switching with fallback control information in accordance with examples as disclosed herein.

FIG. 10 shows a block diagram 1000 of a device 1005 that supports performing carrier switching with fallback control information in accordance with examples as disclosed herein. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to performing carrier switching with fallback control information). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to performing carrier switching with fallback control information). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of performing carrier switching with fallback control information as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for identifying that carrier switching is enabled at a UE for a physical uplink control channel. The communications manager 1020 may be configured as or otherwise support a means for transmitting, to the UE, a physical downlink control channel that does not include an indication for how to perform the carrier switching. The communications manager 1020 may be configured as or otherwise support a means for transmitting, to the UE, a downlink transmission on a primary serving cell of a set of multiple serving cells in a physical uplink control channel group. The communications manager 1020 may be configured as or otherwise support a means for receiving, from the UE, feedback information for the downlink transmission, where the feedback information is received on one of the set of multiple serving cells configured for the UE based on carrier switching being enabled at the UE and the physical downlink control channel.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
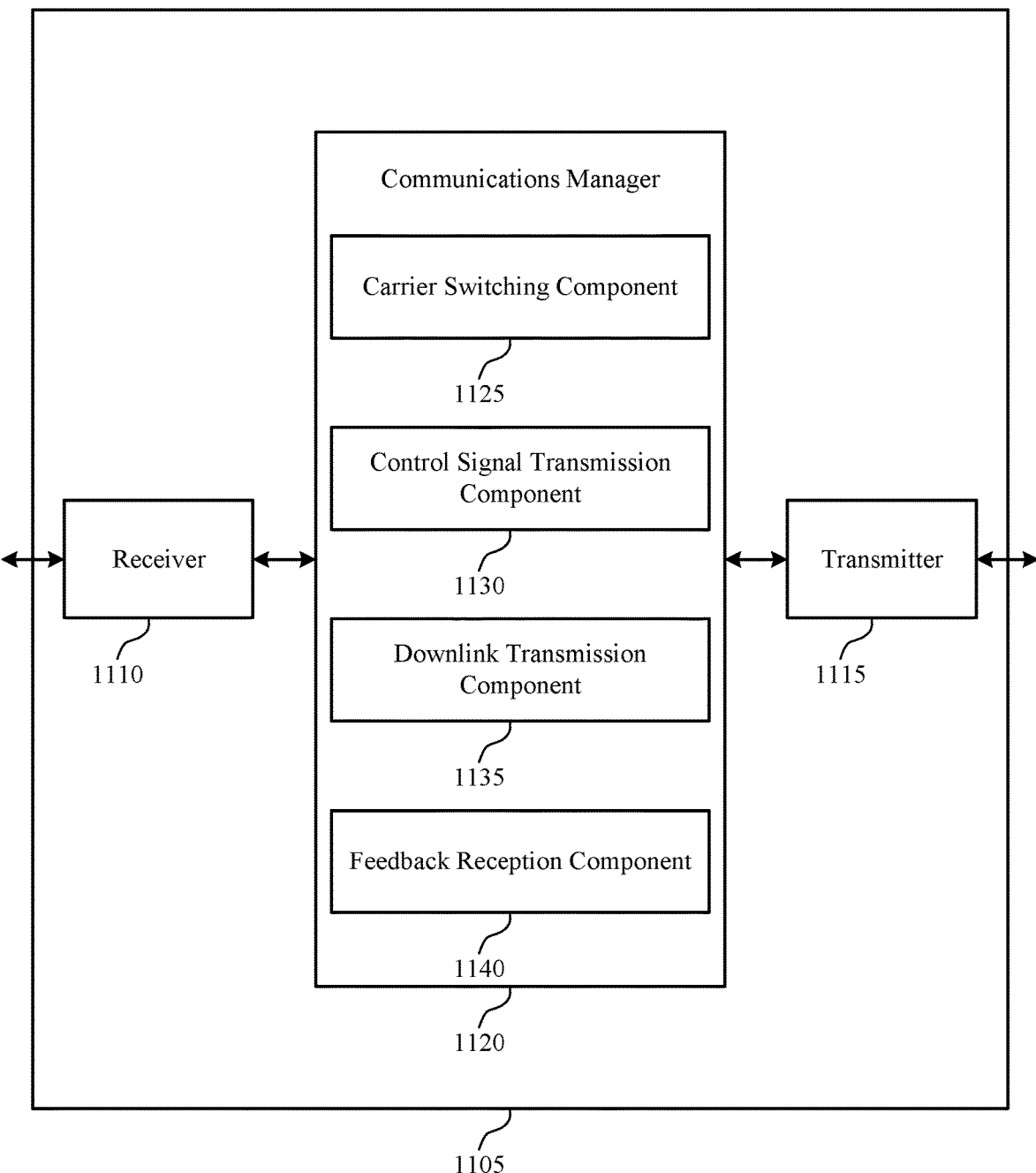

FIG. 11 shows a block diagram 1100 of a device 1105 that supports performing carrier switching with fallback control information in accordance with examples as disclosed herein. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to performing carrier switching with fallback control information). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to performing carrier switching with fallback control information). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of performing carrier switching with fallback control information as described herein. For example, the communications manager 1120 may include a carrier switching component 1125, a control signal transmission component 1130, a downlink transmission component 1135, a feedback reception component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The carrier switching component 1125 may be configured as or otherwise support a means for identifying that carrier switching is enabled at a UE for a physical uplink control channel. The control signal transmission component 1130 may be configured as or otherwise support a means for transmitting, to the UE, a physical downlink control channel that does not include an indication for how to perform the carrier switching. The downlink transmission component 1135 may be configured as or otherwise support a means for transmitting, to the UE, a downlink transmission on a primary serving cell of a set of multiple serving cells in a physical uplink control channel group. The feedback reception component 1140 may be configured as or otherwise support a means for receiving, from the UE, feedback information for the downlink transmission, where the feedback information is received on one of the set of multiple serving cells configured for the UE based on carrier switching being enabled at the UE and the physical downlink control channel.

FIG. 12 shows a block diagram 1200 of a communications manager 1220 that supports performing carrier switching with fallback control information in accordance with examples as disclosed herein. The communications manager 1220 may be an example of aspects of a communications manager 1020, a communications manager 1120, or both, as described herein. The communications manager 1220, or various components thereof, may be an example of means for performing various aspects of performing carrier switching with fallback control information as described herein. For example, the communications manager 1220 may include a carrier switching component 1225, a control signal transmission component 1230, a downlink transmission component 1235, a feedback reception component 1240, a time pattern component 1245, or any combination thereof. Each of these components may communicate, directly or indirectly, with one another (e.g., via one or more buses).

The communications manager 1220 may support wireless communication at a network entity in accordance with examples as disclosed herein. The carrier switching component 1225 may be configured as or otherwise support a means for identifying that carrier switching is enabled at a UE for a physical uplink control channel. The control signal transmission component 1230 may be configured as or otherwise support a means for transmitting, to the UE, a control signal that lacks an indication for carrier switching. The downlink transmission component 1235 may be configured as or otherwise support a means for transmitting, to the UE, a downlink transmission on a primary serving cell of a set of multiple serving cells in a physical uplink control channel group. The feedback reception component 1240 may be configured as or otherwise support a means for receiving, from the UE, feedback information for the downlink transmission, where the feedback information is received on one of the set of multiple serving cells identified based on carrier switching being enabled at the UE while the control signal lacks the indication for carrier switching.

In some examples, to support receiving the feedback information, the feedback reception component 1240 may be configured as or otherwise support a means for receiving the feedback information on a primary serving cell of the set of multiple serving cells. In some examples, to support receiving the feedback information, the time pattern component 1245 may be configured as or otherwise support a means for identifying that a radio resource control signal includes an indication of a carrier switching time pattern. In some examples, to support receiving the feedback information, the feedback reception component 1240 may be configured as or otherwise support a means for receiving the feedback information on a primary serving cell or a secondary serving cell based on identifying that the radio resource control signal includes the indication of the carrier switching time pattern.

In some examples, to support receiving the feedback information, the time pattern component 1245 may be configured as or otherwise support a means for identifying that a radio resource control signal does not include an indication of a carrier switching time pattern. In some examples, to support receiving the feedback information, the feedback reception component 1240 may be configured as or otherwise support a means for receiving the feedback information on a primary serving cell based on identifying that the radio resource control signal does not include the indication of the carrier switching time pattern.

In some examples, to support receiving the feedback information, the time pattern component 1245 may be configured as or otherwise support a means for identifying that a radio resource control signal includes an indication of a carrier switching time pattern. In some examples, to support receiving the feedback information, the control signal transmission component 1230 may be configured as or otherwise support a means for identifying that the control signal is transmitted in a UE-specific search space. In some examples, to support receiving the feedback information, the feedback reception component 1240 may be configured as or otherwise support a means for receiving the feedback information on a secondary serving cell based on identifying that the radio resource control signal includes the indication of the carrier switching time pattern and that the control signal is transmitted in the UE-specific search space.

In some examples, to support receiving the feedback information, the time pattern component 1245 may be configured as or otherwise support a means for identifying that a radio resource control signal includes an indication of a carrier switching time pattern. In some examples, to support receiving the feedback information, the control signal transmission component 1230 may be configured as or otherwise support a means for identifying that the control signal is not transmitted in a UE-specific search space. In some examples, to support receiving the feedback information, the feedback reception component 1240 may be configured as or otherwise support a means for receiving the feedback information on a primary serving cell based on identifying that the radio resource control signal includes the indication of the carrier switching time pattern and that the control signal is transmitted in the UE-specific search space.

FIG. 13 shows a diagram of a system 1300 including a device 1305 that supports performing carrier switching with fallback control information in accordance with examples as disclosed herein. The device 1305 may be an example of or include the components of a device 1005, a device 1105, or a network entity 105 as described herein. The device 1305 may communicate wirelessly with one or more network entities 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting performing carrier switching with fallback control information). For example, the device 1305 or a component of the device 1305 may include a processor 1340 and memory 1330 coupled with the processor 1340, the processor 1340 and memory 1330 configured to perform various functions described herein.

The inter-station communications manager 1345 may manage communications with other network entities 105, and may include a controller or scheduler for controlling communications with UEs 115 in cooperation with other network entities 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for identifying that carrier switching is enabled at a UE for a physical uplink control channel. The communications manager 1320 may be configured as or otherwise support a means for transmitting, to the UE, a control signal that lacks an indication for carrier switching. The communications manager 1320 may be configured as or otherwise support a means for transmitting, to the UE, a downlink transmission on a primary serving cell of a set of multiple serving cells in a physical uplink control channel group. The communications manager 1320 may be configured as or otherwise support a means for receiving, from the UE, feedback information for the downlink transmission, where the feedback information is received on one of the set of multiple serving cells identified based on carrier switching being enabled at the UE while the control signal lacks the indication for carrier switching.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of performing carrier switching with fallback control information as described herein, or the processor 1340 and the memory 1330 may be otherwise configured to perform or support such operations.

FIG. 14 shows a flowchart illustrating a method 1400 that supports performing carrier switching with fallback control information in accordance with examples as disclosed herein. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying that carrier switching is enabled at the UE for a physical uplink control channel. The operations of 1405 may be performed in accordance with examples as disclosed herein. In some examples, aspects of the operations of 1405 may be performed by a carrier switching component 825 as described with reference to FIG. 8.

At 1415, the method may include selecting one of the set of multiple serving cells to transmit feedback information for a downlink transmission, where the selecting is based on carrier switching being enabled at the UE while the physical downlink control channel lacks the field for carrier switching. The operations of 1415 may be performed in accordance with examples as disclosed herein. In some examples, aspects of the operations of 1415 may be performed by a selection component 840 as described with reference to FIG. 8.

At 1420, the method may include transmitting, to the network entity, the feedback information for the downlink transmission in accordance with the selecting. The operations of 1420 may be performed in accordance with examples as disclosed herein. In some examples, aspects of the operations of 1420 may be performed by a feedback transmission component 845 as described with reference to FIG. 8.

FIG. 15 shows a flowchart illustrating a method 1500 that supports performing carrier switching with fallback control information in accordance with examples as disclosed herein. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include identifying that carrier switching is enabled at the UE for a physical uplink control channel. The operations of 1505 may be performed in accordance with examples as disclosed herein. In some examples, aspects of the operations of 1505 may be performed by a carrier switching component 825 as described with reference to FIG. 8.

At 1515, the method may include identifying a carrier switching time pattern configured for the UE by RRC signaling. The operations of 1515 may be performed in accordance with examples as disclosed herein. In some examples, aspects of the operations of 1515 may be performed by a time pattern component 850 as described with reference to FIG. 8.

At 1520, the method may include selecting a secondary serving cell to transmit feedback information based on identifying that the RRC configuration includes the carrier switching time pattern. The operations of 1520 may be performed in accordance with examples as disclosed herein. In some examples, aspects of the operations of 1520 may be performed by a selection component 840 as described with reference to FIG. 8.

At 1525, the method may include transmitting, to the network entity, the feedback information for a downlink transmission in accordance with the selecting. The operations of 1525 may be performed in accordance with examples as disclosed herein. In some examples, aspects of the operations of 1525 may be performed by a feedback transmission component 845 as described with reference to FIG. 8.

FIG. 16 shows a flowchart illustrating a method 1600 that supports performing carrier switching with fallback control information in accordance with examples as disclosed herein. The operations of the method 1600 may be implemented by a network entity or its components as described herein. For example, the operations of the method 1600 may be performed by a network entity 105 as described with reference to FIGS. 1 through 5 and 10 through 13. In some examples, a network entity may execute a set of instructions to control the functional elements of the network entity to perform the described functions. Additionally or alternatively, the network entity may perform aspects of the described functions using special-purpose hardware.

At 1605, the method may include identifying that carrier switching is enabled at a UE for a physical uplink control channel. The operations of 1605 may be performed in accordance with examples as disclosed herein. In some examples, aspects of the operations of 1605 may be performed by a carrier switching component 1225 as described with reference to FIG. 12.

At 1610, the method may include transmitting, to the UE, a physical downlink control channel that does not include an indication for how to perform the carrier switching. The operations of 1610 may be performed in accordance with examples as disclosed herein. In some examples, aspects of the operations of 1610 may be performed by a control signal transmission component 1230 as described with reference to FIG. 12.

At 1615, the method may include receiving, from the UE, feedback information for a downlink transmission, where the feedback information is received on one of a set of multiple serving cells configured for the UE based on carrier switching being enabled at the UE and the physical downlink control channel. The operations of 1615 may be performed in accordance with examples as disclosed herein. In some examples, aspects of the operations of 1615 may be performed by a feedback reception component 1240 as described with reference to FIG. 12.

FIG. 17 shows a flowchart illustrating a method 1700 that supports performing carrier switching with fallback control information in accordance with examples as disclosed herein. The operations of the method 1700 may be implemented by a network entity or its components as described herein. For example, the operations of the method 1700 may be performed by a network entity 105 as described with reference to FIGS. 1 through 5 and 10 through 13. In some examples, a network entity may execute a set of instructions to control the functional elements of the network entity to perform the described functions. Additionally or alternatively, the network entity may perform aspects of the described functions using special-purpose hardware.

At 1705, the method may include identifying that carrier switching is enabled at a UE for a physical uplink control channel. The operations of 1705 may be performed in accordance with examples as disclosed herein. In some examples, aspects of the operations of 1705 may be performed by a carrier switching component 1225 as described with reference to FIG. 12.

At 1710, the method may include transmitting, to the UE, a physical downlink control channel that does not include an indication for how to perform the carrier switching. The operations of 1710 may be performed in accordance with examples as disclosed herein. In some examples, aspects of the operations of 1710 may be performed by a control signal transmission component 1230 as described with reference to FIG. 12.

At 1715, the method may include identifying that a radio resource control signal includes an indication of a carrier switching time pattern. The operations of 1715 may be performed in accordance with examples as disclosed herein.

In some examples, aspects of the operations of 1715 may be performed by a time pattern component 1245 as described with reference to FIG. 12.

At 1720, the method may include identifying that the physical downlink control channel is transmitted in a UE-specific search space. The operations of 1720 may be performed in accordance with examples as disclosed herein. In some examples, aspects of the operations of 1720 may be performed by a control signal transmission component 1230 as described with reference to FIG. 12.

At 1725, the method may include receiving feedback information on a secondary serving cell based on identifying that the radio resource control signal includes the indication of the carrier switching time pattern and that the physical downlink control channel is transmitted in the UE-specific search space. The operations of 1725 may be performed in accordance with examples as disclosed herein. In some examples, aspects of the operations of 1725 may be performed by a feedback reception component 1240 as described with reference to FIG. 12.

The following provides an overview of aspects of the present disclosure:

Aspect 1: A method for wireless communication at a UE, comprising: identifying that carrier switching is enabled at the UE for a physical uplink control channel; selecting one of a plurality of serving cells to transmit feedback information for a downlink transmission, wherein the selecting is based at least in part on carrier switching being enabled at the UE and receiving a physical downlink control channel that lacks an indication of how to perform the carrier switching; and transmitting, to the network entity, the feedback information for the downlink transmission in accordance with the selecting.

Aspect 2: The method of aspect 1, wherein selecting one of the plurality of serving cells further comprises: selecting a primary serving cell of the UE to transmit the feedback information for the downlink transmission.

Aspect 3: The method of any of aspects 1 through 2, further comprising: identifying, for the primary serving cell, a scheduling conflict between uplink transmission of the feedback information and a downlink reception; scanning, according to a predefined ordering associated with the carrier switching time pattern configured for the UE, remaining serving cells of the plurality of serving cells for the availability of uplink resources to transmit the feedback information; and selecting the secondary serving cell in accordance with the availability of uplink resources on the secondary serving cell.

Aspect 4: The method of any of aspects 1 through 3, wherein selecting one of the plurality of serving cells further comprises: identifying a carrier switching time pattern configured for the UE by radio resource control signaling; and selecting a primary serving cell or a secondary serving cell to transmit the feedback information based at least in part on identifying the carrier switching time pattern.

Aspect 5: The method of any of aspects 1 through 4, wherein selecting one of the plurality of serving cells further comprises: identifying that a radio resource control configuration of the UE does not include a carrier switching time pattern; and selecting a primary serving cell of the UE to transmit the feedback information based at least in part on identifying that the radio resource control configuration does not include the carrier switching time pattern.

Aspect 6: The method of any of aspects 1 through 5, wherein selecting one of the plurality of serving cells further comprises: identifying that a radio resource control configuration of the UE includes a carrier switching time pattern;

identifying that the control signal is received in a UE-specific search space; and selecting a secondary serving cell to transmit the feedback information based at least in part on identifying that the RRC configuration includes carrier switching time pattern and that the control signal is received in the UE-specific search space.

Aspect 7: The method of any of aspects 1 through 6, wherein selecting one of the plurality of serving cells further comprises: identifying that a radio resource control configuration includes a carrier switching time pattern; identifying that the control signal is not received in a UE-specific search space; and selecting a primary serving cell to transmit the feedback information based at least in part on identifying that the radio resource control configuration includes carrier switching time pattern and that the control signal is received in the UE-specific search space.

Aspect 8: The method of any of aspects 1 through 7, the indication of how to perform the carrier switching comprises a downlink control information (DCI) format 1_0, or 1_1, or 1_2.

Aspect 9: A method for wireless communication at a network entity, comprising: identifying that carrier switching is enabled at a UE for a physical uplink control channel; transmitting, to the UE, a physical downlink control channel that does not include an indication for how long to perform the carrier switching; and receiving, from the UE, feedback information for a downlink transmission, wherein the feedback information is received on one of a plurality of serving cells configured for the UE based at least in part on carrier switching being enabled at the UE and the physical downlink control channel Aspect 10: The method of aspect 9, wherein receiving the feedback information further comprises: receiving the feedback information on a primary serving cell of the plurality of serving cells.

Aspect 11: The method of any of aspects 9 through 10, wherein receiving the feedback information further comprises: identifying that a radio resource control signal includes an indication of a carrier switching time pattern; and receiving the feedback information on a primary serving cell or a secondary serving cell a secondary serving cell based at least in part on identifying that the radio resource control signal includes the indication of the carrier switching time pattern.

Aspect 12: The method of any of aspects 9 through 11, wherein receiving the feedback information further comprises: identifying that a radio resource control signal does not include an indication of a carrier switching time pattern; and receiving the feedback information on a primary serving cell based at least in part on identifying that the radio resource control signal does not include the indication of the carrier switching time pattern.

Aspect 13: The method of any of aspects 9 through 12, wherein receiving the feedback information further comprises: identifying that a radio resource control signal includes an indication of a carrier switching time pattern; identifying that the physical downlink control channel is transmitted in a UE-specific search space; and receiving the feedback information on a secondary serving cell based at least in part on identifying that the radio resource control signal includes the indication of the carrier switching time pattern and that the physical downlink control channel is transmitted in the UE-specific search space.

Aspect 14: The method of any of aspects 9 through 13, wherein receiving the feedback information further comprises: identifying that a radio resource control signal includes an indication of a carrier switching time pattern;

identifying that the physical downlink control channel is not transmitted in a UE-specific search space; and receiving the feedback information on a primary serving cell based at least in part on identifying that the radio resource control signal includes the indication of the carrier switching time pattern and that the physical downlink control channel is transmitted in the UE-specific search space.

Aspect 15: The method of any of aspects 9 through 14, the indication of how to perform the carrier switching comprises a downlink control information (DCI) format 1_0, or 1_1, or 1_2.

Aspect 16: An apparatus for wireless communication, comprising a processor; memory coupled with the processor; and instructions stored in the memory and executable by the processor to cause the apparatus to perform a method of any of aspects 1 through 8.

Aspect 17: An apparatus for wireless communication, comprising at least one means for performing a method of any of aspects 1 through 8.

Aspect 18: A non-transitory computer-readable medium storing code for wireless communication at a UE, the code comprising instructions executable by a processor to perform a method of any of aspects 1 through 8.

Aspect 19: An apparatus for wireless communication, comprising a processor; memory coupled with the processor; and instructions stored in the memory and executable by the processor to cause the apparatus to perform a method of any of aspects 9 through 15.

Aspect 20: An apparatus for wireless communication, comprising at least one means for performing a method of any of aspects 9 through 15.

Aspect 21: A non-transitory computer-readable medium storing code for wireless communication at a network entity, the code comprising instructions executable by a processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
identifying that carrier switching is enabled at the UE for a physical uplink control channel;
selecting one of a primary serving cell or a secondary serving cell from a plurality of serving cells to transmit feedback information for a downlink transmission, wherein the selecting is based at least in part on carrier switching being enabled at the UE, and wherein selecting the primary serving cell or the secondary serving cell is in accordance with a carrier switching time pattern and is based at least in part on receiving a physical downlink control channel that lacks an indication of how to perform the carrier switching; and
transmitting the feedback information for the downlink transmission in accordance with the selecting.

2. The method of claim 1, wherein selecting one of the primary serving cell or the secondary serving cell further comprises:
selecting the primary serving cell of the UE to transmit the feedback information for the downlink transmission.

3. The method of claim 2, further comprising:
identifying, for the primary serving cell, a scheduling conflict between uplink transmission of the feedback information and a downlink reception;
scanning, according to a predefined ordering associated with the carrier switching time pattern configured for the UE, remaining serving cells of the plurality of serving cells for an availability of uplink resources to transmit the feedback information; and selecting the secondary serving cell in accordance with the availability of uplink resources on the secondary serving cell.

4. The method of claim 1, wherein selecting one of the primary serving cell or the secondary serving cell further comprises:

identifying the carrier switching time pattern configured for the UE by radio resource control (RRC) signaling; and selecting the primary serving cell or the secondary serving cell to transmit the feedback information based at least in part on identifying the carrier switching time pattern.

5. The method of claim 1, wherein selecting one of the primary serving cell or the secondary serving cell further comprises:

identifying that a radio resource control (RRC) configuration of the UE does not include the carrier switching time pattern; and selecting the primary serving cell of the UE to transmit the feedback information based at least in part on identifying that the RRC configuration does not include the carrier switching time pattern.

6. The method of claim 1, wherein selecting one of the primary serving cell or the secondary serving cell further comprises:

identifying that a radio resource control (RRC) configuration of the UE includes the carrier switching time pattern;

identifying that the physical downlink control channel is received in a UE-specific search space; and selecting the secondary serving cell to transmit the feedback information based at least in part on identifying that the RRC configuration includes the carrier switching time pattern and that the physical downlink control channel is received in the UE-specific search space.

7. The method of claim 1, wherein selecting one of the primary serving cell or the secondary serving cell further comprises:

identifying that a radio resource control (RRC) configuration of the UE includes the carrier switching time pattern;

identifying that the physical downlink control channel is not received in a UE-specific search space; and selecting the primary serving cell to transmit the feedback information based at least in part on the carrier switching time pattern and that the physical downlink control channel is not received in the UE-specific search space.

8. The method of claim 1, wherein the indication of how to perform the carrier switching comprises a downlink control information (DCI) format 1_0, or 1_1, or 1_2.

9. A method for wireless communication at a network entity, comprising:

identifying that carrier switching is enabled at a user equipment (UE) for a physical uplink control channel;

transmitting, to the UE, a physical downlink control channel that does not include an indication for how to perform the carrier switching; and receiving, from the UE, feedback information for a downlink transmission, wherein the feedback information is received on one of a primary serving cell or a secondary serving cell from a plurality of serving cells configured for the UE in accordance with a carrier switching time pattern and is based at least in part on carrier switching being enabled at the UE and on the physical downlink control channel.

10. The method of claim 9, wherein receiving the feedback information further comprises:

receiving the feedback information on the primary serving cell of the plurality of serving cells.

11. The method of claim 9, wherein receiving the feedback information further comprises:

identifying that a radio resource control signal includes an indication of the carrier switching time pattern; and receiving the feedback information on the primary serving cell or the secondary serving cell based at least in part on identifying that the radio resource control signal includes the indication of the carrier switching time pattern.

12. The method of claim 9, wherein receiving the feedback information further comprises:

identifying that a radio resource control signal does not include an indication of the carrier switching time pattern; and receiving the feedback information on the primary serving cell based at least in part on identifying that the radio resource control signal does not include the indication of the carrier switching time pattern.

13. The method of claim 9, wherein receiving the feedback information further comprises:

identifying that a radio resource control signal includes an indication of the carrier switching time pattern;

identifying that the physical downlink control channel is transmitted in a UE-specific search space; and receiving the feedback information on the secondary serving cell based at least in part on identifying that the radio resource control signal includes the indication of the carrier switching time pattern and that the physical downlink control channel is transmitted in the UE-specific search space.

14. The method of claim 9, wherein receiving the feedback information further comprises:

identifying that a radio resource control signal includes an indication of the carrier switching time pattern;

identifying that the physical downlink control channel is not transmitted in a UE-specific search space; and receiving the feedback information on the primary serving cell based at least in part on identifying that the radio resource control signal includes the indication of the carrier switching time pattern and that the physical downlink control channel is not transmitted in the UE-specific search space.

15. The method of claim 9, wherein the indication of how to perform the carrier switching comprises a downlink control information (DCI) format 1_0, or 1_1, or 1_2.

16. A user equipment (UE) for wireless communication, comprising:

one or more memories storing processor-executable code; and one or more processors coupled with the one or more memories and operable to execute the code to cause the UE to:

identify that carrier switching is enabled at the UE for a physical uplink control channel;

select one of a primary serving cell or a secondary serving cell from a plurality of serving cells to transmit feedback information for a downlink transmission, wherein the selecting is based at least in part on carrier switching being enabled at the UE, and wherein selecting the primary serving cell or the secondary serving cell is in accordance with a carrier switching time pattern and is based at least in part on receiving a physical downlink control channel that lacks an indication of how to perform the carrier switching; and transmit the feedback information for the downlink transmission in accordance with the selecting.

17. The UE of claim 16, wherein, to select one of the primary serving cell or the secondary serving cell, the one or more processors are further operable to execute the code to cause the UE to:

select the primary serving cell of the UE to transmit the feedback information for the downlink transmission.

18. The UE of claim 16, wherein, to select one of the primary serving cell or the secondary serving cell, the one or more processors are further operable to execute the code to cause the UE to:

identify that a radio resource control signal includes an indication of the carrier switching time pattern; and select the primary serving cell or the secondary serving cell to transmit the feedback information based at least in part on identifying that the radio resource control signal includes the indication of the carrier switching time pattern.

19. The UE of claim 18, wherein the one or more processors are further operable to execute the code to cause the UE to:

identify, for the primary serving cell, a scheduling conflict between uplink transmission of the feedback information and a downlink reception;

scanning, accord to a predefined ordering associated with the carrier switching time pattern configured for the UE, remaining serving cells of the plurality of serving cells for an availability of uplink resources to transmit the feedback information; and selecting the secondary serving cell in accordance with the availability of uplink resources on the secondary serving cell.

20. The UE of claim 16, wherein, to select one of the primary serving cell or the secondary serving cell, the one or more processors are further operable to execute the code to cause the UE to:

identify that a radio resource control (RRC) configuration of the UE does not include the carrier switching time pattern; and select the primary serving cell of the UE to transmit the feedback information based at least in part on identifying that the RRC configuration does not include the carrier switching time pattern.

21. The UE of claim 16, wherein, to select one of the primary serving cell or the secondary serving cell, the one or more processors are further operable to execute the code to cause the UE to:

identify that a radio resource control (RRC) configuration of the UE includes the carrier switching time pattern;

identify that the physical downlink control channel is received in a UE-specific search space; and select the secondary serving cell to transmit the feedback information based at least in part on identifying that RRC configuration includes the carrier switching time pattern and that the physical downlink control channel is received in the UE-specific search space.

22. The UE of claim 16, wherein, to select one of the primary serving cell or the secondary serving cell, the one or more processors are further operable to execute the code to cause the UE to:

identify that a radio resource control (RRC) configuration of the UE includes the carrier switching time pattern;

identify that the physical downlink control channel is not received in a UE-specific search space; and select the primary serving cell to transmit the feedback information based at least in part on the carrier switching time pattern and that the physical downlink control channel is not received in the UE-specific search space.

23. The UE of claim 16, wherein the indication of how to perform the carrier switching comprises a downlink control information (DCI) format 1_0, or 1_1, or 1_2.

24. A network entity for wireless communication, comprising:

one or more memories storing processor-executable code; and one or more processors coupled with the one or more memories and operable to execute the code to cause the network entity to:

identify that carrier switching is enabled at a user equipment (UE) for a physical uplink control channel;

transmit, to the UE, a physical downlink control channel that does not include an indication for how to perform the carrier switching; and receive, from the UE, feedback information for a downlink transmission, wherein the feedback information is received on one of a primary serving cell or a secondary serving cell from a plurality of serving cells configured for the UE in accordance with a carrier switching time pattern and is based at least in part on carrier switching being enabled at the UE and on the physical downlink control channel.

25. The network entity of claim 24, wherein, to receive the feedback information, the one or more processors are further operable to execute the code to cause the UE to:

receive the feedback information on the primary serving cell of the plurality of serving cells.

26. The network entity of claim 24, wherein, to receive the feedback information, the one or more processors are further operable to execute the code to cause the UE to:

identify that a radio resource control signal includes an indication of the carrier switching time pattern; and receive the feedback information on the primary serving cell or the secondary serving cell based at least in part on identifying that the radio resource control signal includes the indication of the carrier switching time pattern.

27. The network entity of claim 24, wherein, to receive the feedback information, the one or more processors are further operable to execute the code to cause the UE to:

identify that a radio resource control signal does not include an indication of the carrier switching time pattern; and receive the feedback information on the primary serving cell based at least in part on identifying that the radio resource control signal does not include the indication of the carrier switching time pattern.

28. The network entity of claim 24, wherein, to receive the feedback information, the one or more processors are further operable to execute the code to cause the UE to:

identify that a radio resource control signal includes an indication of the carrier switching time pattern;

identify that the physical downlink control channel is transmitted in a UE-specific search space; and receive the feedback information on the secondary serving cell based at least in part on identifying that the radio resource control signal includes the indication of the carrier switching time pattern and that the physical downlink control channel is not transmitted in the UE-specific search space.

29. The network entity of claim 24, wherein, to receive the feedback information, the one or more processors are further operable to execute the code to cause the UE to:

identify that a radio resource control signal includes an indication of the carrier switching time pattern;

identify that the physical downlink control channel is not transmitted in a UE-specific search space; and receive the feedback information on the primary serving cell based at least in part on identifying that the radio resource control signal includes the indication of the carrier switching time pattern and that the physical downlink control channel is not transmitted in the UE-specific search space.

30. The network entity of claim 24, wherein the indication of how to perform the carrier switching comprises a downlink control information (DCI) format 1_0, or 1_1, or 1_2.

\* \* \* \* \*